United States Patent
Newman et al.

(10) Patent No.: US 10,644,282 B2
(45) Date of Patent: May 5, 2020

(54) STAGGERED BATTERY CELL ARRAY WITH TWO-DIMENSIONAL INLINE TERMINAL EDGES

(71) Applicant: NIO USA, Inc., San Jose, CA (US)

(72) Inventors: Austin L. Newman, San Jose, CA (US); Alexander J. Smith, Mountain View, CA (US)

(73) Assignee: NIO USA, Inc., San Jose, CA (US)

( * ) Notice: Subject to any disclaimer, the term of this patent is extended or adjusted under 35 U.S.C. 154(b) by 108 days.

(21) Appl. No.: 15/878,312

(22) Filed: Jan. 23, 2018

(65) Prior Publication Data
US 2019/0229309 A1    Jul. 25, 2019

(51) Int. Cl.
| H01M 2/10 | (2006.01) |
| H01M 2/30 | (2006.01) |
| H01M 2/20 | (2006.01) |
| H01M 10/42 | (2006.01) |

(52) U.S. Cl.
CPC ......... *H01M 2/1077* (2013.01); *H01M 2/206* (2013.01); *H01M 2/30* (2013.01); *H01M 2010/4271* (2013.01); *H01M 2220/20* (2013.01)

(58) Field of Classification Search
CPC ............................ H01M 2/1077; H01M 2/206
See application file for complete search history.

(56) References Cited

U.S. PATENT DOCUMENTS

| 4,448,863 A | 5/1984 | Terrell |
| 5,364,203 A | 11/1994 | Ishikawa |
| 6,381,122 B2 | 4/2002 | Wagener |
| 6,420,655 B1 | 7/2002 | Yang et al. |
| 6,619,005 B1 | 9/2003 | Chen |
| 6,672,914 B1 | 1/2004 | Claprood |
| 7,007,471 B2 | 3/2006 | Sinclair |
| 7,489,105 B2 | 2/2009 | Weinstein et al. |

(Continued)

FOREIGN PATENT DOCUMENTS

| DE | 102010033806 | 2/2012 |
| EP | 1026770 | 8/2000 |

(Continued)

OTHER PUBLICATIONS

Official Action for U.S. Appl. No. 15/928,738, dated May 15, 2019 6 pages, Restriction Requirement.

(Continued)

*Primary Examiner* — Olatunji A Godo
(74) *Attorney, Agent, or Firm* — Sheridan Ross P.C.

(57) ABSTRACT

An energy storage device including a staggered energy storage cell internal array with two-dimensional inline terminal edges is provided. The energy storage cells in a battery module may be staggered in an internal array, such that a first row of cells in a line are spaced apart, or offset, in a first direction from an immediately adjacent second row of cells in a line, and wherein a first cell in the second row of cells is offset from a first cell in the first row of cells in a second direction orthogonal to the first direction. In some cases, at least two adjacent rows in the battery module may include energy storage cells that are offset from one another but aligned in one direction, such as, the second direction. A mechanical frame may define the arrangement of the energy storage cells relative to one another.

20 Claims, 12 Drawing Sheets

(56) References Cited

U.S. PATENT DOCUMENTS

| | | |
|---|---|---|
| 7,820,319 B2 | 10/2010 | Mehta et al. |
| 8,586,226 B2 | 11/2013 | Hashida |
| 8,893,714 B2 | 11/2014 | Ricci et al. |
| 8,920,955 B1 | 12/2014 | Chuang et al. |
| 9,160,040 B2 | 10/2015 | Koenekamp et al. |
| 9,208,756 B2 | 12/2015 | Isaac |
| 9,287,200 B2 | 3/2016 | Higgins, III |
| 9,444,122 B2 | 9/2016 | Zheng et al. |
| 9,472,794 B1 | 10/2016 | Zakhrayan et al. |
| 9,545,010 B2 | 1/2017 | Coakley et al. |
| 9,548,476 B2 | 1/2017 | Cicero et al. |
| 9,577,240 B2 | 2/2017 | Choi et al. |
| 9,579,963 B2 | 2/2017 | Landgraf |
| 2008/0272742 A1 | 11/2008 | Hart et al. |
| 2010/0092849 A1* | 4/2010 | Wood .................. H01M 2/1072 429/99 |
| 2010/0247996 A1 | 9/2010 | Ijaz et al. |
| 2011/0052949 A1 | 3/2011 | Byun et al. |
| 2011/0068623 A1 | 3/2011 | Kenington |
| 2012/0003508 A1 | 1/2012 | Narbonne et al. |
| 2012/0100761 A1 | 4/2012 | Große et al. |
| 2012/0121949 A1 | 5/2012 | Eberhard et al. |
| 2013/0202928 A1 | 8/2013 | Beulque et al. |
| 2013/0320918 A1 | 12/2013 | Ohmer et al. |
| 2014/0113506 A1 | 4/2014 | Jones |
| 2014/0154539 A1 | 6/2014 | Kwok et al. |
| 2014/0234683 A1 | 8/2014 | Sweney |
| 2014/0255750 A1 | 9/2014 | Jan et al. |
| 2016/0020446 A1 | 1/2016 | Zheng et al. |
| 2016/0093846 A1 | 3/2016 | Malinski et al. |
| 2017/0018750 A1 | 1/2017 | Wintner |
| 2017/0040646 A1 | 2/2017 | Beaston |
| 2017/0358832 A1 | 12/2017 | Sun et al. |

FOREIGN PATENT DOCUMENTS

| | | |
|---|---|---|
| EP | 1990849 | 11/2008 |
| EP | 2343755 | 7/2011 |
| WO | WO 2016/070801 | 5/2016 |

OTHER PUBLICATIONS

U.S. Appl. No. 15/900,079, filed Feb. 20, 2018, Smith et al.
U.S. Appl. No. 15/928,707, filed Mar. 22, 2018, Newman et al.
U.S. Appl. No. 15/928,738, filed Mar. 22, 2018, Newman et al.
U.S. Appl. No. 15/922,455, filed Mar. 15, 2018, Newman et al.
"Heat Staking, Staking plastic using heat and pressure," Amada, 2015, retrieved from http://www.amadamiyachi.com/servlet/servlet.FileDownload?retURL=%2Fapex%2Feducationalresources_articles&file=01580000001dQXV, 2 pages.
"OPTIMA™ Batteries," Optima Batteries, Inc., 2012, 9 pages.
U.S. Appl. No. 15/928,780, filed Mar. 22, 2018, Newman et al.
Official Action for U.S. Appl. No. 15/900,079, dated Nov. 15, 2019 12 pages.
Official Action for U.S. Appl. No. 15/928,707, dated Oct. 3, 2019 10 pages.
Official Action for U.S. Appl. No. 15/928,738, dated Oct. 23, 2019 14 pages.
Official Action for U.S. Appl. No. 15/928,780, dated Oct. 7, 2019 7 pages, Restriction Requirement.
Notice of Allowance for U.S. Appl. No. 15/928,707, dated Feb. 6, 2020 7 pages.
Official Action for U.S. Appl. No. 15/928,780, dated Dec. 31, 2019 10 pages.
Official Action for U.S. Appl. No. 15/922,455, dated Dec. 30, 2019 14 pages.

* cited by examiner

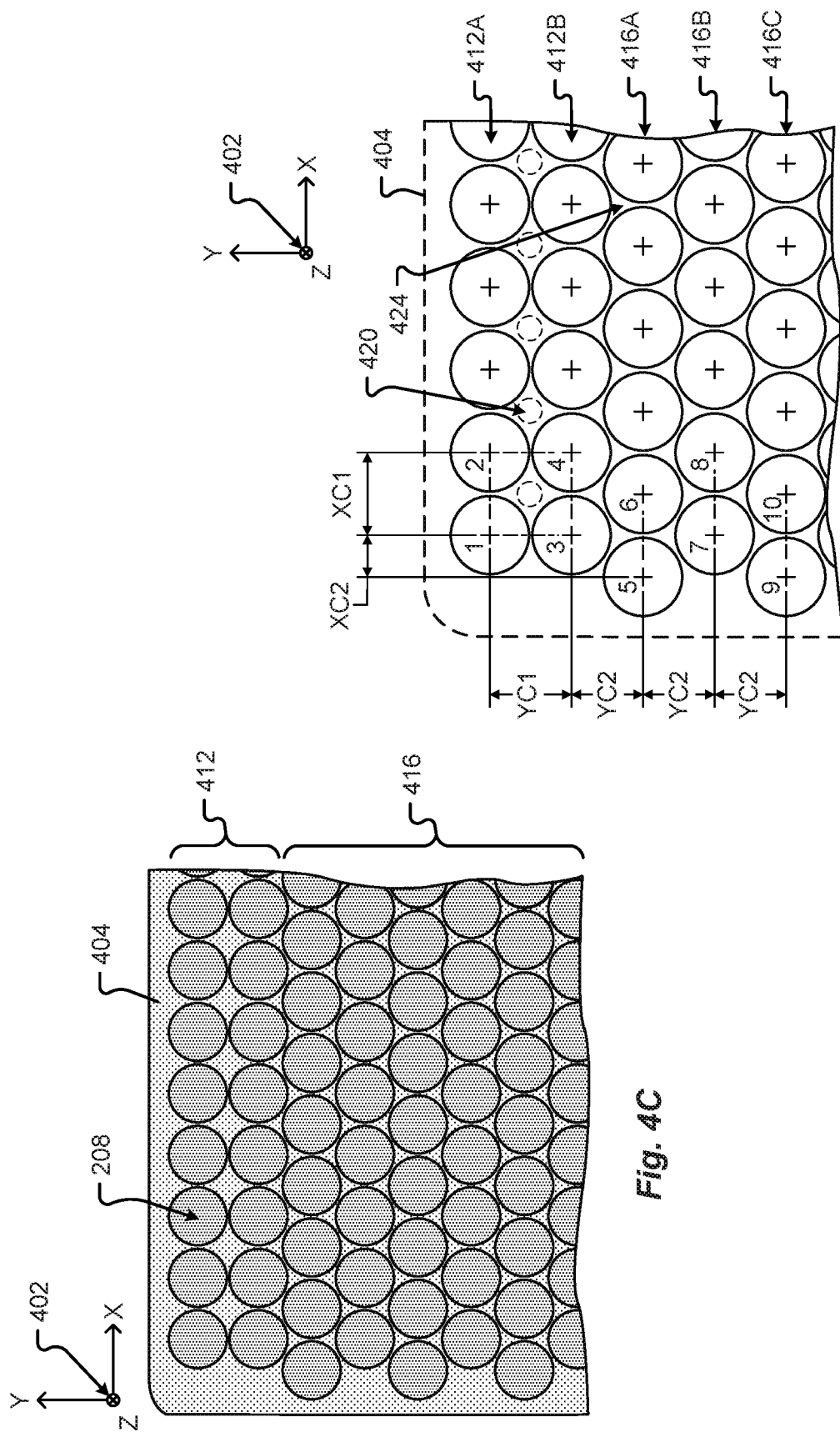

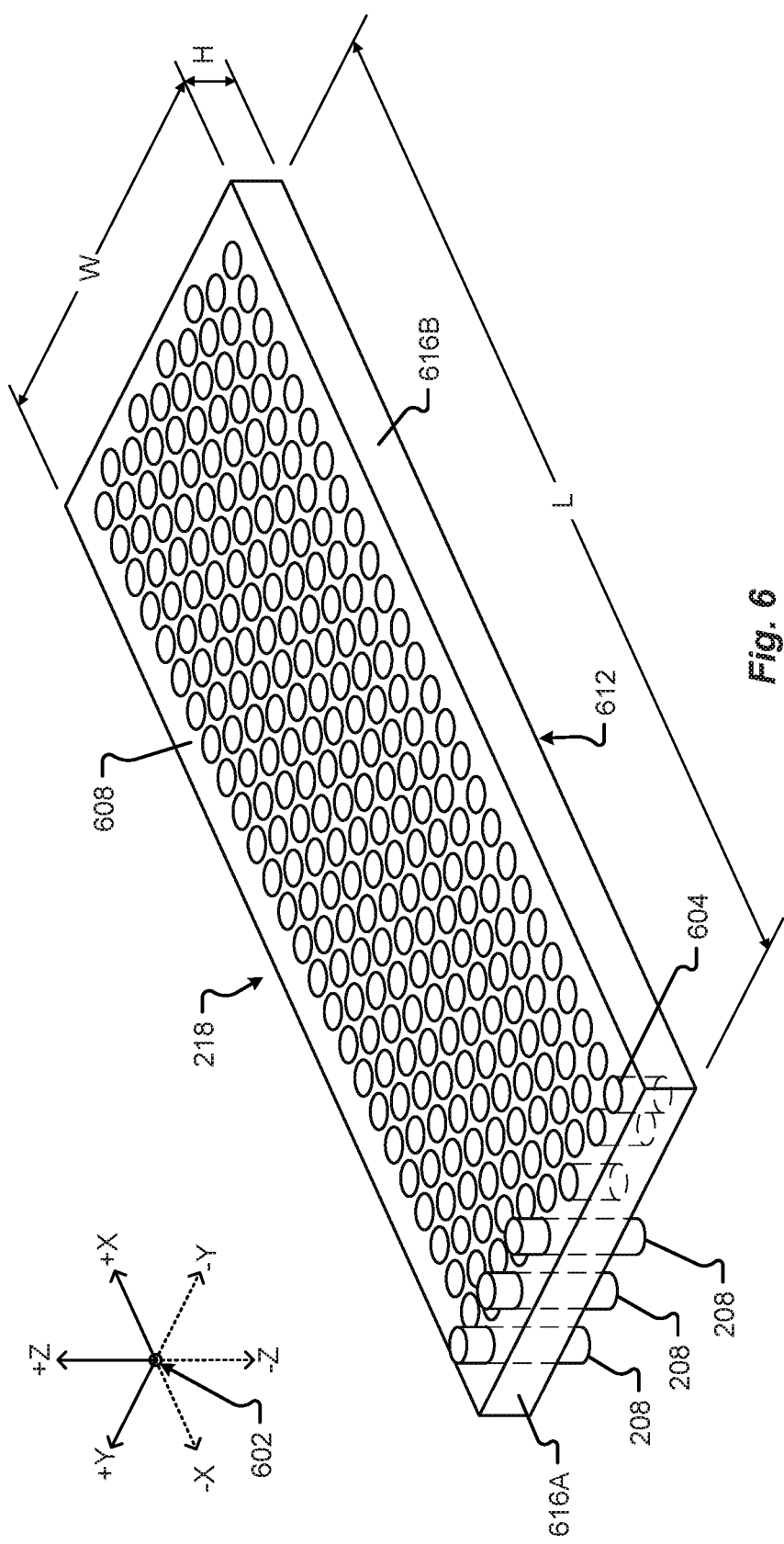

STAGGERED BATTERY CELL ARRAY WITH TWO-DIMENSIONAL INLINE TERMINAL EDGES

FIELD

The present disclosure is generally directed to energy storage devices, in particular, toward batteries and battery modules for electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

Vehicles employing at least one electric motor and power system store electrical energy in a number of on board energy storage devices. These vehicle energy storage devices are generally arranged in the form of electrically interconnected individual battery modules containing a number of individual battery cells. The battery modules are generally connected to an electrical control system to provide a desired available voltage, ampere-hour, and/or other electrical characteristics to a vehicle. In some cases, one or more of the battery modules in a vehicle can be connected to a battery management system that is configured to monitor the voltage sensed from each cell in the battery module and/or the entire battery.

Electric vehicles are dependent on the integrity and reliability of the on board electrical energy power supply and energy storage devices. Typical vehicle energy storage devices include a battery that is composed of a number of battery modules and each of these battery modules may include tens, if not hundreds, of battery cells. As can be appreciated, the chance of failure in a system is proportionate to the number of components, interconnections, and connection modes, etc., in the energy storage devices of a vehicle.

BRIEF DESCRIPTION OF THE DRAWINGS

FIG. 4C shows a detail broken section plan view of the battery cells and structural support of FIG. 4B;

FIG. 4D shows a schematic detail broken section plan view of the spacing for the battery cells and structural support shown in FIG. 4C;

FIG. 6 shows a perspective view of a battery cell retaining form and/or gasket in accordance with embodiments of the present disclosure;

DETAILED DESCRIPTION

Figure 1:
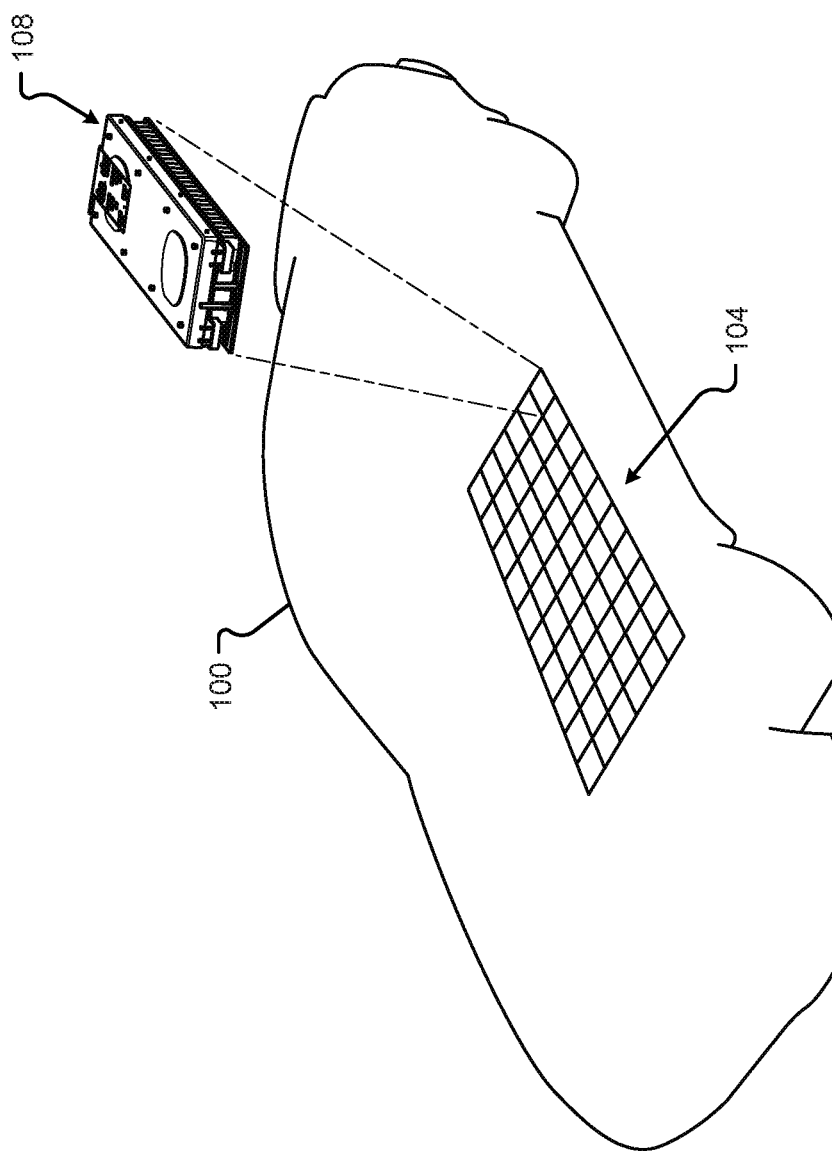
FIG. 1 shows a schematic perspective view of an electrical energy storage system in accordance with embodiments of the present disclosure.

Embodiments of the present disclosure will be described in connection with electrical energy storage devices, and in some embodiments the construction, structure, and arrangement of components making up a battery module for an electric vehicle drive system.

An electrical energy storage device for a vehicle may include at least one battery including a number of battery modules electrically interconnected with one another to provide electromotive force for the electrical drive system of a vehicle to operate. Each battery module in the at least one battery can include any number of battery cells contained and/or arranged within a battery module housing. Conventional battery module housings may include a base and a cover which are attached at a periphery of the battery module via one or more fasteners. Because these conventional housings are designed to maximize the number of battery cells contained therein, all of the fasteners and attachments are moved to an outer periphery of the housing, and the cover and base are generally made from thick plastic or metal to provide structural rigidity and integrity. As can be appreciated, these conventional housings (e.g., covers, bases, etc.) can be large, heavy, and costly. Furthermore, most battery modules include external safety structures to provide impact resistance.

Typically, the battery is also one of the largest, heaviest, and most expensive single components of an electric vehicle. As can be appreciated, any reduction in size and/or weight can have significant cost savings. The present disclosure describes a unified battery module including an integrated battery cell structural support system made up of structural foam, adhesive, and interconnecting carrier halves. In some embodiments, the present disclosure describes a method of forming a lightweight unified battery module including attaching separate battery module carrier portions together (via an adhesive flange joint) and filling a cavity inside the portions with a structural foam.

In one embodiment, the unified battery module may include a lower carrier portion and an upper carrier portion configured to surround one or more battery cells packed in a specific arrangement. The carrier portions may be temporarily joined together at a contacting flange via an adhesive and then permanently interconnected to one another via a structural foam, or other structural adhesive, injected between the battery cells and an inside of the adhesively-joined carrier portions.

Among other things, the unified battery module provides impact resistance by dissipating an impact across a structure (e.g., made up of solidified, or cured, structural foam etc.) encompassing, or at least partially surrounding, the battery cells inside the battery module. In some cases, the battery cells may behave as connection nodes, or bridges, to which the structural foam adheres and forms a protective internal structure for the battery module. The structure may be configured to flexibly move in response to an applied force or impact. This structural foam may act as a structural adhesive, thermal insulator, and even a dielectric barrier within the module. In some embodiments, the base of the module may be bonded to a cooling, or cold, plate using a structural adhesive that provides a thermal conductor (e.g., thermal interface material), and a di-electric barrier between the elements.

The upper and lower carrier portions of the battery module may be configured as thin dielectric (e.g., plastic, composite, or other electrically nonconductive or insulative material, etc.) components that house the battery cells and the structural foam. When joined together and filled with the structural foam, the carrier portions and the foam provide a lightweight battery module configured to absorb shock, impact, compression, and/or any other destructive force.

Among other things, the present disclosure describes manufacturing methods, construction, and an arrangement of components that fuse together forming a battery module. At least one benefit of the embodiments described herein is observed in the event of a crash scenario. For example, by mechanically coupling the cells together (e.g., via the structural adhesive) in the arrangement described, the load, force, or impact energy from a crash is distributed across a larger body rather than focused on a single battery cell or small group of battery cells. As can be appreciated, this distribution of forces provides a safer battery module assembly and battery for a vehicle since it is less likely that a single cell will be damaged to the extent that it would cause a thermal event or a non-passive failure in the energy storage device of the vehicle.

In some embodiments, during the assembly of a battery module, for instance, structural and/or adhesive foam may be injected from one or more sides of the battery module to provide rigidity, strength, insulation, and exact tolerance "no slop" fits between cells. At least one advantage to side-filling is that more of the structural and/or adhesive foam, while in a liquid state, is allowed to enter the battery module cavity at a faster rate (e.g., by providing an increased open space between the curved bodies of rows of battery cells, rather than via a space between only four adjacent battery cells). However, filling the battery module with foam from the side without any control structure could allow foam to cover the positive terminal, leak through openings, and otherwise disperse throughout the battery module in an uneven manner. Among other things, the present disclosure provides a control structure configured to contain foam in a particular volume of the battery module and protect portions of the battery cells and module from uncontrolled filling or leakage.

In one embodiment, the present disclosure provides a form having an array of die-cut apertures to accommodate the battery cells in the battery module. Each of the die-cut apertures may be configured to tightly fit around a battery cell (e.g., the apertures may be undersized or have a smaller diameter than a diameter of the battery cell—interference fit, be matched to the size of the battery cell diameter, and/or include a slip fit, etc.). This tight fit may prevent foam injected into the housing from extending beyond a designed level. In one embodiment, as the foam solidifies or hardens and expands, the form may be moved along an axis of the battery module a known amount.

The form may additionally contact one or more sides of the housing in a similar interference, tight, or slip fit (as described in conjunction with the apertures) providing a gasket that prevents material from pouring out of the connectors or other portions of the module. In some embodiments, the form may be made from a relatively thin amount of material (e.g., closed-cell foam, plastic, silicone, etc.).

In some embodiments, the form may be used to hold the battery cells in alignment with one another prior to filling with structural and/or adhesive foam and then may remain in place after foam has been injected.

The present disclosure describes a number of dielectric bolt compression sleeve mounts that interconnect a cover to a base of a battery module housing inside a periphery of the battery module and an area including battery cells. Among other things, moving the attachment features inside the battery cell array can provide a more rigid structure, allow for lighter materials (e.g., thinner cross-sections, composites, polymers, etc.) to be used, and allow a densely-packed battery comprising a number of battery modules in intimate or near-intimate contact with one another.

In some embodiments, the battery module may be held together via a number of dielectric compression sleeve mounts, or standoffs. Each sleeve mount may be configured as a substantially cylindrical (or other shaped) tube extending from a top of the battery module to a bottom of the battery module. In one embodiment, the sleeve mount may provide a fastener contact load surface at the top of the battery module, a compression region (e.g., along the length of the sleeve), and a mount frame contact load surface at the bottom of the battery module. The sleeve mount may be sized to provide a clamp height for the battery module such that when a fastener is inserted through the sleeve and tightened against the mount frame, a clamping force is provided holding the cover to the base of the housing, but any additional compressive force imparted by the fastener is taken up by the sleeve (preventing displacement of the cover below a predetermined height).

The sleeves may be made from Garolite G10, fiberglass, ceramic coated materials, fiberglass-epoxy laminates, etc. In one embodiment, one or more of the sleeves may be used as an assembly interface configured to interconnect with assembly equipment. For example, the sleeves may be configured to receive quick-release pins that when inserted into the sleeve compresses a ball-detent into the shaft of the pin and releases from a compressed position when the ball-detent passes through the sleeve (e.g., beyond the mount frame contact load surface). In some cases, the quick-release pins may be a part of a robot end-effector, pick-and-place, or other tool, and can be used to move or manipulate the battery module during assembly. Being disposed on the inside of the battery module periphery, the sleeves allow for closer packaging and automated assembly operations to be performed.

Not only does the bolt sleeve connect the upper and lower portions of the battery module housing, but the sleeves may act as a compression limiter, and create a dielectric barrier between the bolt and the live cell casings. The sleeves can also serve as a manufacturing aid, helping align each battery cell when building a battery module. In some embodiments, the sleeves may function as a structural anchor when structural foam and/or adhesive is added (the sleeve and plastic may be weak (e.g., in non-compression scenarios, etc.) until a major portion of the surface area of the sleeve encompassed by a filler material (e.g., the structural adhesive, etc.) creating a reinforced bar in the assembly of components.

In some embodiments, the present disclosure provides a battery module including a staggered battery cell internal array with two-dimensional inline terminal edges. The battery cells in a module may be staggered in an internal array, such that a first row of cells in a line are spaced apart, or offset, in a first direction from an immediately adjacent second row of cells in a line, and wherein a first cell in the second row of cells is offset from a first cell in the first row of cells in a second direction orthogonal to the first direction. In some cases, at least two adjacent rows in the module may include cells that are offset from one another but aligned in one direction (e.g., the second direction). Among other things, this arrangement may provide an engineered space between a group of four adjacent battery cells for fasteners, reinforcement structure, structural foam insert holes, thermocouples, and/or other objects. This design of combining battery cell arrangements creates a cross pack that saves space by moving conventional external components to an inside area of the battery module rather than taking up an increased amount of space external to the inside area. Moreover, the proposed arrangement maximizes the density and number of battery cells inside a battery module while moving fasteners and other features to an outermost point (inside battery module periphery) in between two rows of battery cells making up the terminal edges of the module. Contrary to conventional battery cell packing, where a battery cell is removed for fasteners, the battery cell spacing is increased to make room for fasteners, or mounting features are pushed to an outside of the battery module, maintaining a homogeneous packing structure, the present disclosure provides a densely packed array of "staggered" internal rows and outermost rows arranged inline to receive battery module and/or cover mounting features (e.g., fasteners, etc.).

As can be appreciated, because the battery is one of the largest, heaviest, and most expensive single components of an electric vehicle, any reduction in size and/or weight can have significant cost savings. In some embodiments, the present disclosure describes a lightweight battery cell location frame that is retained in the housing of a battery module. The battery cell location frame may be configured to locate and position each of the battery cells in the battery module prior to the insertion of a structural material and remain in place after assembly. The battery cell location frame may be a part of, or integral to, the housing and/or cover. In one embodiment, the battery cell location frame. In one embodiment, the frame may include a number of standoffs (e.g., three, six, etc.) surrounding a receptacle, or opening, that is configured to receive a battery cell. Each standoff may be joined by a bridge having a clearance volume disposed thereunder. The opening may be sized (e.g., oversized, or sized larger than the battery cell diameter, etc.) to allow the battery cell to be inserted therein from either side of the frame. In some cases, the receptacle may be oversized to receive a battery cell and accommodate for tolerance differences, thermal expansion, and/or receive a portion of the structural material. The standoffs may provide a number of structural material flow paths around a portion of the negative terminal end of the battery cell such that structural material injected into the battery module and flowing between battery cells may disperse under, through, and/or between these flow paths. In some embodiments, one or more of the standoffs may include a through hole for aeration of adhesive, such that an inserted frame may force adhesive into and through at least a portion of the through hole. This small hole disposed in between battery cells passes completely through the plastic. Among other things, the small hole provides a potential passage for air to escape (e.g., as air bubbles under the battery cells are undesirable) and depending on the fill height, structural material can flow up the hole and over the top surface of the standoff creating a structural "rivet" feature once cured. In one embodiment, a thermal adhesive or structural foam can be injected into the battery module (at a bottom, or lower, portion) and as the battery cells are seated in contact with glass (or dielectric) beads/spheres, the adhesive/foam may be forced into an empty volume of the flow path (under the bridges). Among other things, this volume may allow the material to dissipate or move from under each battery cell into the volume and allow the battery cells to move in contact with the glass beads/spheres providing an exact height for each cell in the module. In addition, the battery cell location frame also sets and maintains a desired spacing between the battery cells in the battery module. Moreover, the battery cell location frame provides an optimum distance between battery cells to allow structural foam (e.g., dielectric structural foam, etc.) to flow therebetween.

Referring to FIG. 1, a schematic perspective view of an electrical energy storage system, or battery 104 comprising a number of electrical energy storage devices, or battery modules, 108 is shown in accordance with embodiments of the present disclosure. In one embodiment, the battery 104 may be configured to provide the electromotive force needed for the electrical drive system of a vehicle 100 to operate. Although the present disclosure recites batteries 104, battery modules 108, and/or battery cells as examples of electrical energy storage units, embodiments of the disclosure should not be so limited. For example, the battery cells 108, and/or any other energy storage device disclosed herein, may be any electrical energy storage cell including, but in no way limited to, battery cells, capacitors, ultracapacitors, supercapacitors, etc., and/or combinations thereof.

In some embodiments, the battery modules 108 may be electrically interconnected via at least one battery busbar including high voltage positive and negative terminals connected to an electrical system of the vehicle 100. The battery 104 may be configured as any number of battery modules 108 that are capable of being electrically connected together.

Figure 2A:
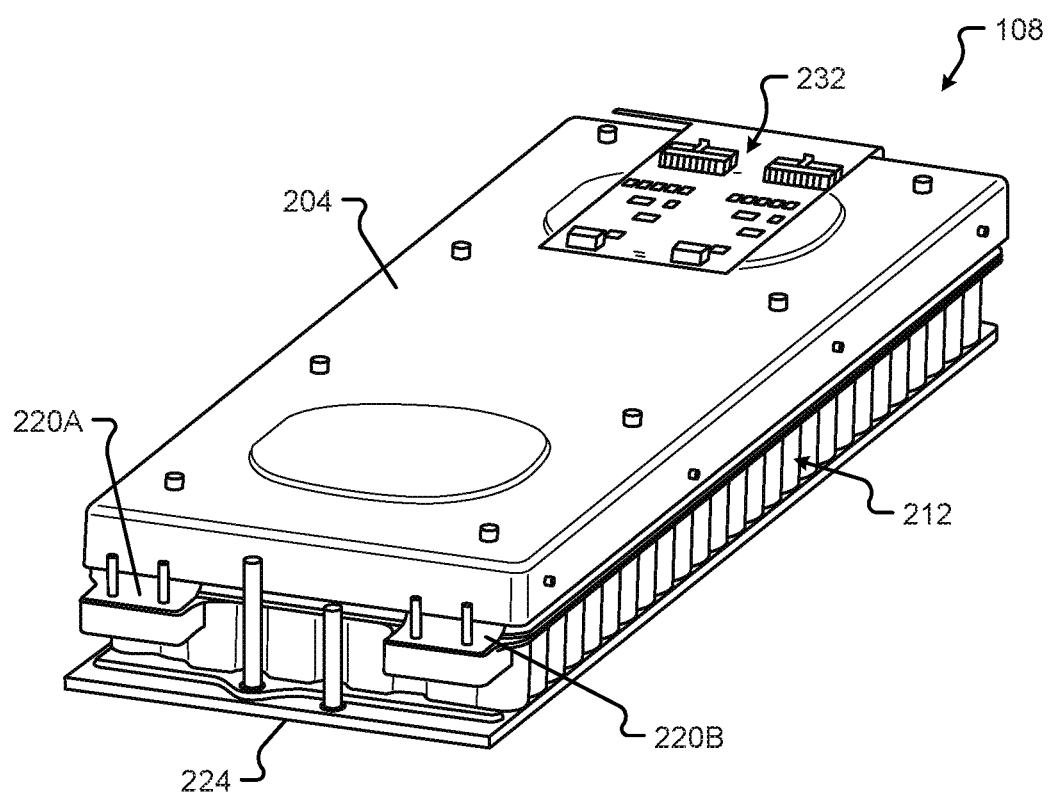
FIG. 2A shows a perspective view of a battery module in accordance with embodiments of the present disclosure.
Figure 2B:
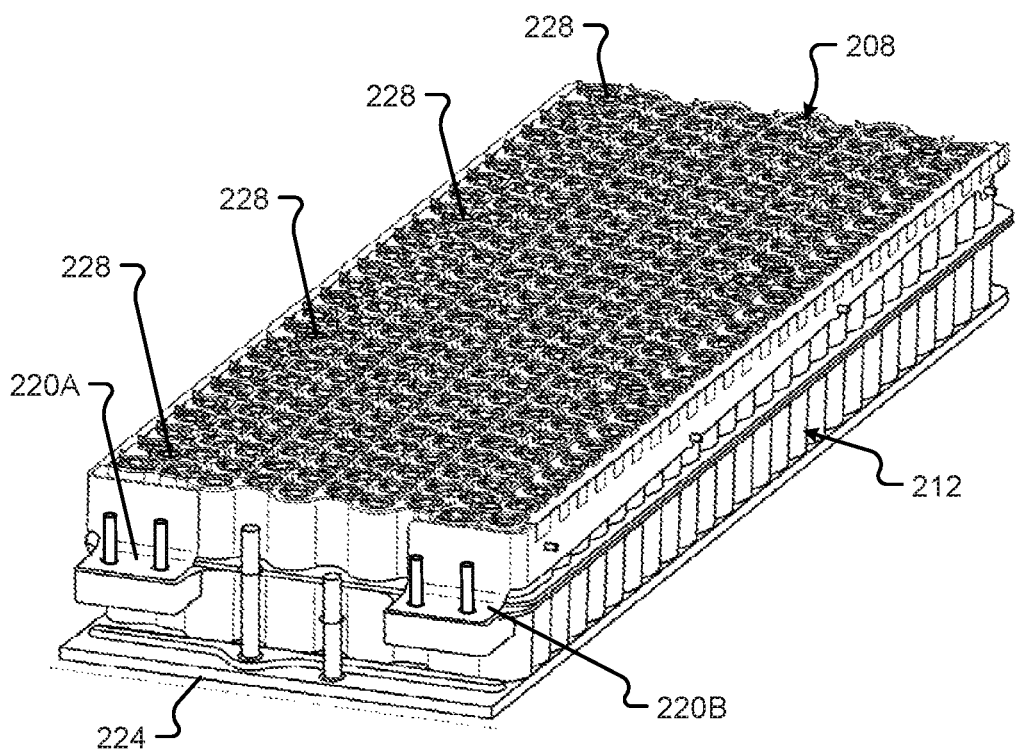
FIG. 2B shows a perspective view of the battery module of FIG. 2A with an upper shield removed.
Figure 2C:
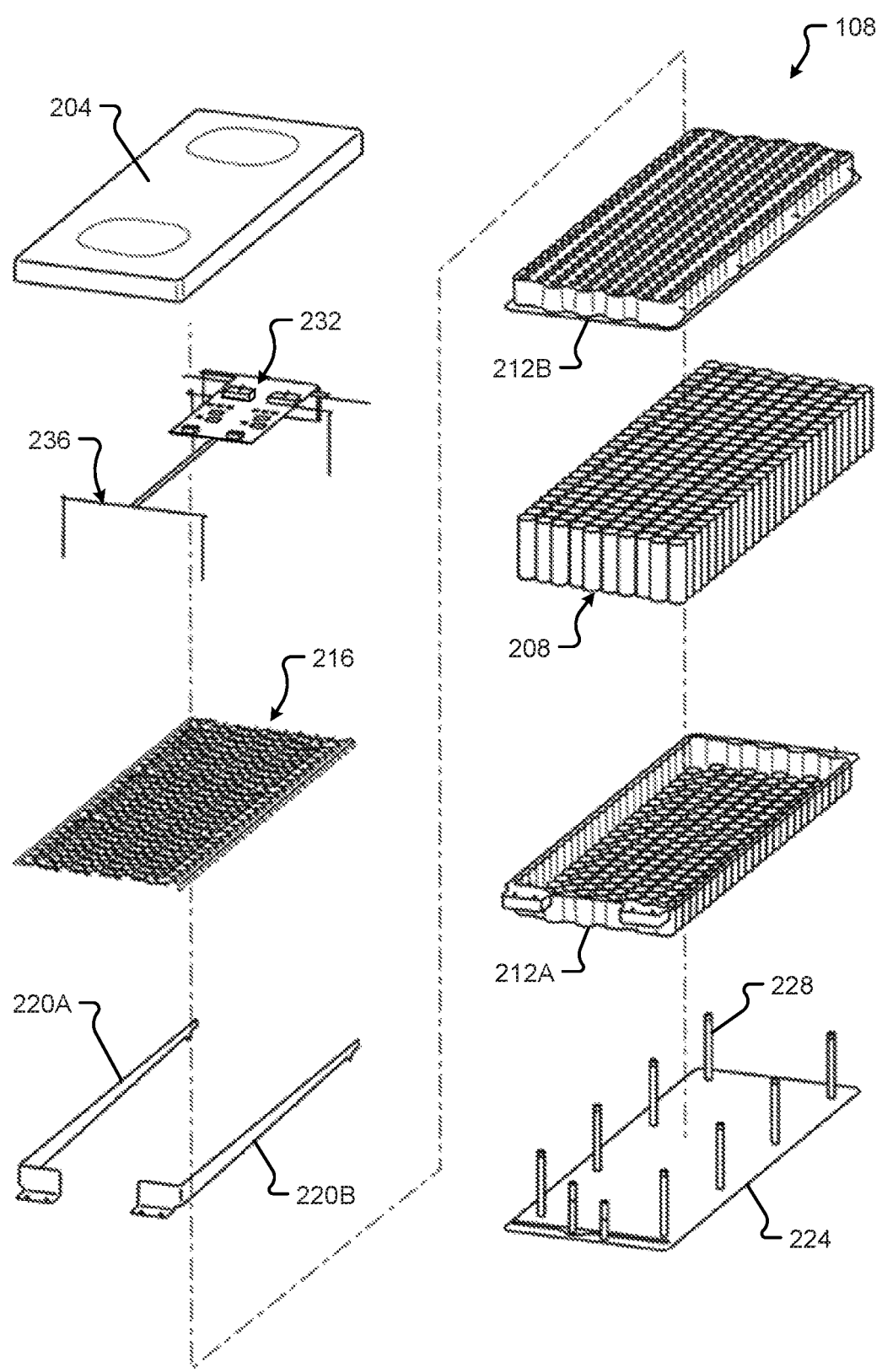
FIG. 2C shows a perspective exploded view of the battery module of FIG. 2A.

FIGS. 2A-2C show various perspective views of a battery module 108 in accordance with embodiments of the present disclosure. The battery module 108 may comprise an upper shield 204, a plurality of battery cells 208, a housing or carrier 212 configured to contain the battery cells 208, battery cell interconnects 216, first and second battery module busbars 220A, 220B, a cooling plate 224, and one or more mount sleeves 228. In some embodiments, the battery module 108 may include a battery management system 232 and sensing system 236.

FIG. 2A shows a perspective view of a battery module 108 in accordance with embodiments of the present disclosure. The battery module 108 shown in FIG. 2A includes an upper shield 204 configured to substantially cover the battery cell interconnects 216, battery cells 208, and other electrical connections (e.g., first and second battery module busbars 220A, 220B, etc.). In some embodiments, the upper shield 204 may correspond to a drip shield. In any event, the upper shield 204 may be made from molded, formed, or otherwise shaped plastic, dielectric, or nonconductive material. In one embodiment, the battery management system (BMS) 232 electronics (e.g., printed circuit board, chips, etc.) may be mounted to an exterior or interior surface of the upper shield 204. As shown in FIG. 2A, the BMS 232 and corresponding electronics are mounted to an exterior surface (e.g., a surface separate and spaced apart from the battery cells 208 and battery cell interconnects 216, etc.).

FIG. 2B shows a perspective view of the battery module 108 of FIG. 2A with the upper shield 204, BMS 232, and other electronics removed for the sake of clarity. As shown in FIG. 2B, the first and second battery module busbars 220A, 220B extend from a high voltage connection end, including two connection standoffs per busbar 220A, 220B, along the length of the battery module 108 to the opposite end of the battery module 108.

In FIG. 2C, the housing 212 is shown having a lower housing 212A and an upper housing, or cover, 212B. In some embodiments, the lower housing 212A and cover 212B may be interconnected with one another to form the complete housing 212. As shown in FIG. 2C, the lower housing 212A and/or the cover 212B may be configured to at least partially contain a number of battery cells 208. For instance, both the lower housing 212A and the cover 212B include a number of surfaces and walls defining battery cell 208 containment cavities including volumes for receiving the battery cells 208. Both the lower housing 212A and cover 212B may include a number of receptacles sized to receive and arrange each of the battery cells 208 relative to one another. In one embodiment, the lower housing 212A and cover 212B may include receptacles, or apertures, configured to receive one or more fasteners and mount sleeves 228.

Figure 3:
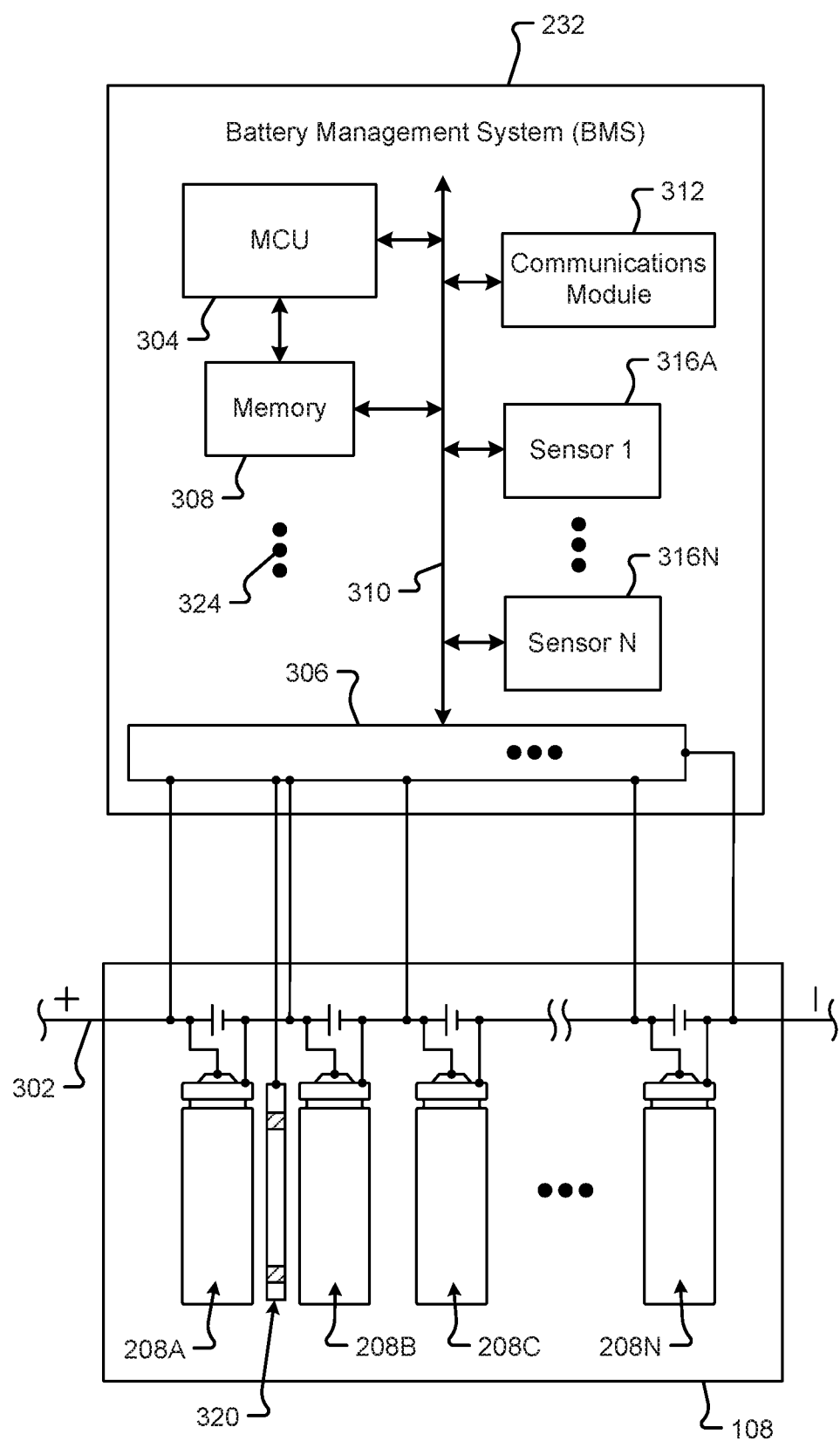
FIG. 3 shows a schematic block diagram of the battery management system in accordance with embodiments of the present disclosure.

FIG. 3 shows a schematic block diagram of the BMS 232 interconnected with the battery module 108 in accordance with embodiments of the present disclosure. In some embodiments, each battery module 108 of a battery 104 may include a corresponding unique BMS 232. In other embodiments, the multi-module battery 104 comprising a number of battery modules 108 may be monitored and/or controlled by a single multi-module BMS.

The BMS 232 may include a bus 306 including a number of terminals configured to interconnect with electrical lines 302 interconnected with the battery cells 208 of the battery module 108. In some embodiments, the interconnection between the battery module 108 and the BMS 232 may be via a physical electrical connector disposed on the battery module 108, the BMS 232, and/or both the battery module 108 and the BMS 232. The BMS 232 may be configured to monitor and/or control a state of charge associated with each battery cell 208A-N in the battery module 108. In some embodiments, the BMS 232 may include a microcontroller unit (MCU) 304, including one or more processors, interconnected with a memory 308 via at least one connection, or communications bus 310. The memory 308 may be one or more disk drives, optical storage devices, solid-state storage devices such as a random access memory (RAM) and/or a read-only memory (ROM), which can be programmable, flash-updateable and/or the like. Additionally or alternatively, the BMS 232 may include a communications module 312, one or more sensors 316A-N, and/or other components 324 interconnected with the communication bus 310, charger (not shown), and/or other systems in an electric power distribution system (not shown). The communications module 312 may include a modem, a network card (wireless or wired), an infra-red communication device, etc. and may permit data to be exchanged with a network and/or any other charger or processor in the electric power distribution system as described.

In any event, pairs of electrical interconnections may provide voltages from the battery module 108 to the MCU 304 of the BMS 232 and these voltages may be used to determine a state (e.g., voltage, current, state of charge, etc.) associated with a particular battery cell 208A-N in the battery module 108.

Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

In one embodiment, the sensors 316A-N may include one or more temperature sensors, thermocouples, pressure sensors, etc. The sensors 316A-N may be disposed between, adjacent to, spaced apart from, and/or in contact with, one or more of the battery cells 208A-N. As shown in FIG. 3, a multiple-zone thermocouple 320 is disposed between adjacent battery cells 208A, 208B in the battery module 108. The multiple-zone thermocouple 320 may include a housing having a first temperature sensing region disposed adjacent to a lower portion (e.g., bottom) of the battery cells 208 and a second temperature sensing region disposed adjacent to an upper portion (e.g., top) of the battery cells 208. The first temperature sensing region of the multiple-zone thermocouple 320 may correspond to a junction where two dissimilar metals of the thermocouple 320 are joined together and the other ends of the two dissimilar metals are attached to the BMS 232, and more specifically, the sensor (e.g., sensors 316A-N) configured to measure a voltage change at the junction when temperature changes. Similarly, the second temperature sensing region of the multiple-zone thermocouple 320 may correspond to a junction where a different set of two dissimilar metals of the thermocouple 320 are joined together and the other ends of the different set of two dissimilar metals are attached to the BMS 232, and more specifically, the sensor (e.g., sensors 316A-N) configured to measure a voltage change at the junction when temperature changes. This multiple-zone thermocouple 320 may allow the BMS 232 to determine, via the corresponding one or more sensors 316A-N, a temperature at the bottom and the top of groups of battery cells 208 using a single thermocouple housing or inserted device.

Figure 4A:
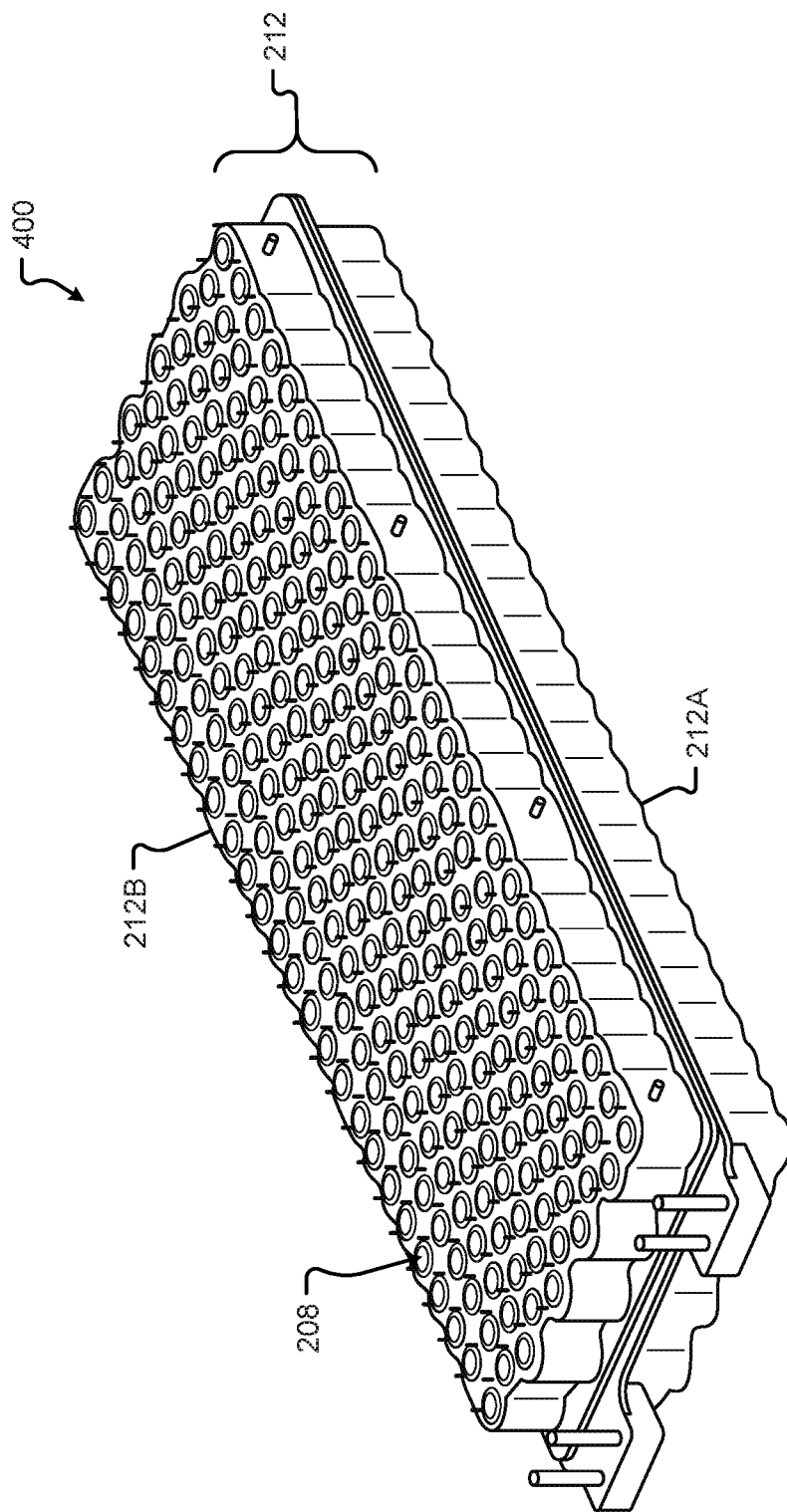
FIG. 4A shows a perspective view of the joined housing and cells forming the integrated battery cell structural support for the battery module in accordance with embodiments of the present disclosure.
Figure 4B:
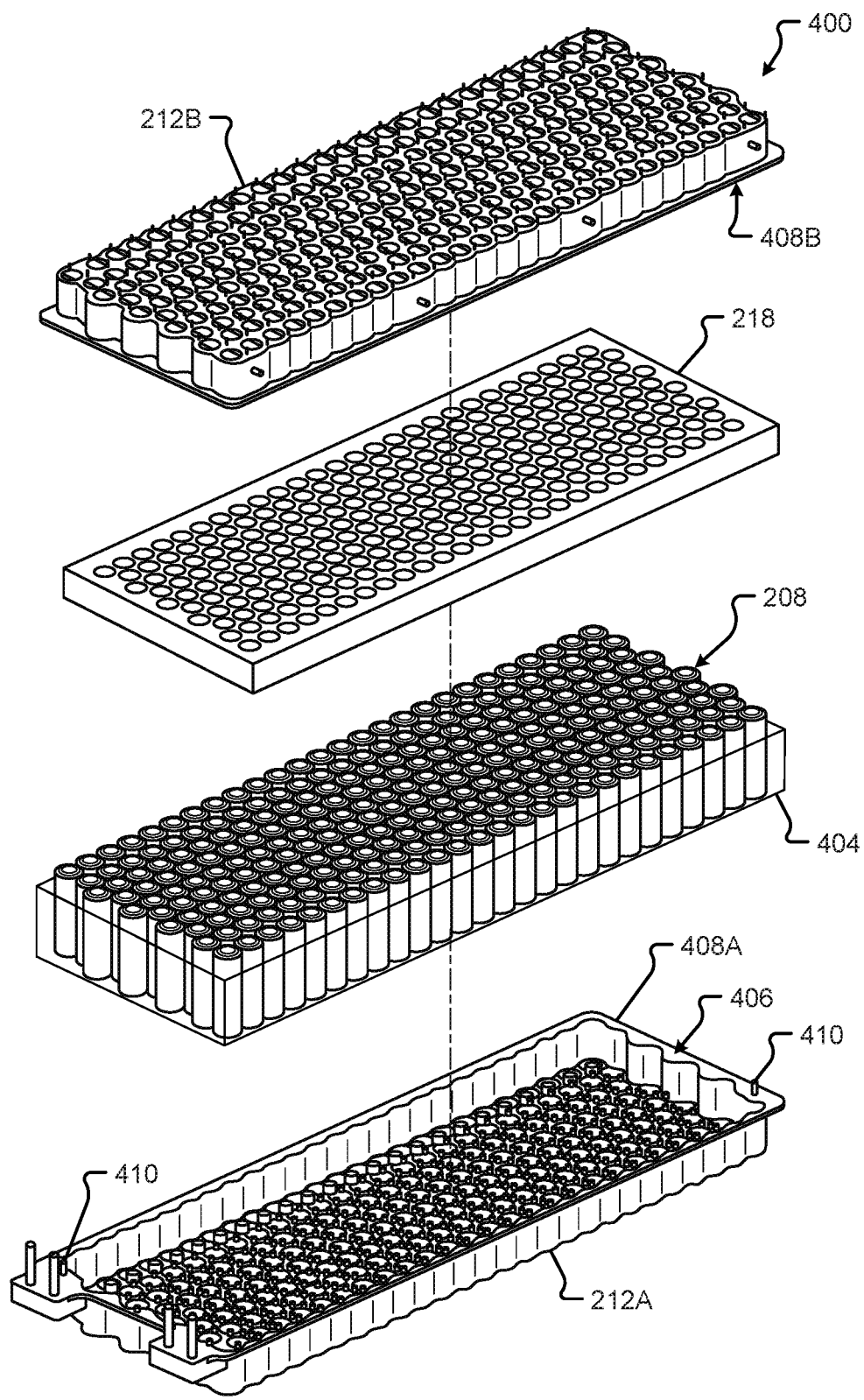
FIG. 4B shows an exploded perspective view of the battery module integrated battery cell structural support of FIG. 4A.

FIGS. 4A and 4B show various perspective views of the integrated battery cell structural support 400 for the battery module 108. The integrated battery cell structural support 400 may at least comprise the lower housing 212A, the battery cells 208, the cover 212, and a structural adhesive 404 disposed between adjacent battery cells 208 as well as between the battery cells 208 and the lower housing 212A and cover 212B. During assembly, the structural adhesive 404 may be configured to flow into the spaces between spaced-apart adjacent battery cells 208 and other areas around the battery cells 208 and inside the housing 212. Once cured, or hardened, the structural adhesive 404 may adhere to and connect the battery cells 208 forming a unified structure configured to resist forces and absorb impact or shock through a network of connected nodes in the battery module 108. Additionally or alternatively, the structural adhesive 404 may adhere to and connect the battery cells 208 to the various portions of the housing 212 (e.g., lower housing 212A, cover 212B, etc.) and/or other components of the battery module 108 (e.g., the one or more mount sleeves 228, battery cell retaining form, and/or gasket, 218, etc.). The structural adhesive 404 may correspond to the structural foam that acts as a structural adhesive, thermal insulator, and even a dielectric barrier within the battery module 108.

In some embodiments, the integrated battery cell structural support 400 may include a battery cell retaining form 218. The battery cell retaining form 218 may be configured as a die cut or formed block of material (e.g., foam, lightweight plastic, etc.) including a number of receptacles formed therethrough. These receptacles may be sized to receive at least a portion of the array of battery cells 208 and the form 218 may be configured to act as a gasket (e.g., preventing the structural adhesive 404 from expanding through the array of receptacles as the structural adhesive cures in the housing 212).

Referring to FIG. 4A, a perspective view of the joined housing 212 and battery cells 208 forming the integrated battery cell structural support 400 for the battery module 108 is shown in accordance with embodiments of the present disclosure. When joined together, the housing 212, the battery cells 208, and the structural adhesive 404 form a unified structural force distribution system allowing the entire system of interconnected elements to move upon receiving a force or impact.

FIG. 4B shows an exploded perspective view of the battery module integrated battery cell structural support 400 of FIG. 4A. As shown in FIG. 4B, the battery cell retaining form 218 may be disposed at, or adjacent to, an upper portion of the battery cells 208. Among other things, this arrangement of the battery cell retaining form 218 provides a seal, or gasket, between the structural adhesive 404 and the battery cell electrical interconnections 216 (e.g., shown in FIGS. 2B and 2C), preventing uncured and/or cured structural adhesive 404 from reaching these sensitive electrical areas. Although shown in FIG. 4B as an element surrounding the battery cells 208, it should be appreciated that the structural adhesive 404 may be inserted into the spaces surrounding the battery cells 208 while inside the housing 212 in an assembled, or connected, state. The structural adhesive 404 may be inserted or deposited into these spaces while in a fluid, or semi-fluid state, and when cured, the structural adhesive 404 may mechanically connect the elements that are in contact with the structural adhesive 404 (e.g., the battery cells 208, lower housing 212A, the cover 212B, and any other elements, e.g., optionally the battery cell retaining form 218, etc.).

In some embodiments, the lower housing 212A and the cover 212B may be attached together, at least temporarily, via a flanged connection 408A, 408B. For instance, the lower housing 212A may include a flange, or flanged surface, 408A that mates with a mating flanged surface of the cover 212B (e.g., via an adhesive, fastener, connection, tab-and-slot, clip, or other connective interface, etc.). The flanged surface 408A may follow at least a portion of the periphery of the lower housing 212A. The flanged surface 408A may be offset from and substantially parallel to a base, or planar surface, of the lower housing 212A. In one embodiment, the flanged surface 408A may extend outwardly from the walls of the lower housing 212A. The cover 212B may include a similar mating flange, or mating flanged surface, 408B that follows at least a portion of the periphery of the cover 212B and/or the lower 212A. The mating flanged surface 408B of the cover 212B may be offset from and substantially parallel to a planar surface, of the cover 212B. In one embodiment, the mating flanged surface 408B may extend outwardly from the walls of the cover 212B.

It is an aspect of the present disclosure that the flanged surface 408A and/or the mating flanged surface 408B may include an adhesive layer 406 deposited thereon. The adhesive layer 406 may correspond to an adhesive material, double-sided adhesive tape, and/or the like. In any event, the adhesive layer 406 may attach the lower housing 212A to the cover 212B, and more specifically, connect the flanged surface 408A to the mating flanged surface 408B. In one embodiment, the flanged surface 408A and/or the mating flanged surface 408B may include at least one connecting element 410 (e.g., fastener, standoff, post, tab-and-slot, clip, or other connective interface, etc.) that is configured to mate, or interconnect, with a corresponding feature on the other of the flanged surface 408A and/or the mating flanged surface 408B.

FIG. 4C shows a detail broken section plan view of the battery cells 208 and structural adhesive 404 of the battery module 108 shown in FIG. 4B. In some embodiments, the section view of FIG. 4C may be taken through an approximate planar center of the array of battery cells 208 in the battery module 108. As shown in FIG. 4C, the battery cells 208 are arranged in a number of rows and columns forming a two-dimensional cell distribution pattern. The rows are disposed along the Y-axis, referenced by the coordinate system 402 shown, where each row includes a linear array of battery cells 208 extending along the X-axis in the battery module 108. In some embodiments, the battery cells 208 may include a periphery, casing diameter, or outer surface that is at least partially surrounded by the structural adhesive 404, such that no two battery cells 208 are in contact with one another at their peripheries (e.g., separated and/or insulated by the structural adhesive 404). This spacing and arrangement of the cells 208 in the cell distribution pattern is described and shown in greater detail in conjunction with FIGS. 4D and 9A.

In some embodiments, the cell distribution pattern may include combinations of battery cell 208 arrangements, or arrays, which form the entire array of battery cells 208 in the battery module 108. By way of example, the battery module 108 may include edge arrays 412, comprising pairs of inline battery cells 208 running along the X-axis, and an internal or center array 416 that includes a plurality of adjacent staggered rows of battery cells 208. In some embodiments, the edge arrays 412 may be disposed at opposing edges of the battery module 108. The edge arrays 412 may provide an arrangement of battery cells 208 in a pattern where the battery cells 208 of the first row are spaced apart from one another along the X-axis, and where the battery cells 208 of the second row are similarly, if not identically, spaced apart from one another along the X-axis. In one embodiment, the battery cells 208 in the edge array 412 may be equispaced along the X-axis. Each of the battery cells 208 in the first row may be arranged offset and inline, along the Y-axis, with each of the battery cells 208 in the second row of the edge array 412. Among other things, this orthogonal arrangement of battery cells 208 in the edge array 412 can provide an open volume between sets of four immediately adjacent cells 208. The open volume may be capable of receiving a fastener, a fastening sleeve, structural adhesive 404, and/or a standoff internal to the entire array of battery cells 208 of the battery module 108.

The internal array 416 may include a number of staggered rows of battery cells 208 that are disposed between the edge arrays 412 (see, e.g., FIG. 4A). While FIG. 4C shows a representative broken section view of an area of the battery cells 208 and structural adhesive 404, it should be appreciated that the representative cell distribution pattern may be repeated, mirrored, and/or symmetrical about one or more planes of the battery module 108. For example, the battery module 108 may include an edge array 412 disposed at opposing edges of the battery module 108 with the internal array 416 disposed in the center of the battery module 108 (see, e.g., FIG. 4A). In one embodiment, the opposing edges may be associated with terminal edges of the battery module 108. For instance, a first terminal edge may correspond to the positive terminal edge for the battery module 108 and the opposing second terminal edge may correspond to the negative terminal edge for the battery module 108. Each terminal edge may include a respective busbar (e.g., first battery module busbar 220A and second battery module busbar 220B) configured to electrically interconnect with the positive and/or negative terminals of the array of battery cells 208.

FIG. 4D shows a schematic detail broken section plan view of the cell distribution pattern and/or the spacing for the battery cells 208 and structural support 404 shown in FIG. 4C. As described in conjunction with FIG. 4C, the cell distribution pattern includes an edge array 412 and an internal or center array 416. The edge array 412 includes a first row 412A of battery cell positions that are spaced apart from one another by a horizontal distance, XC1, along the X-axis, and a second row 412B of battery cell positions that are spaced apart from one another by the same distance, XC1, along the X-axis. As illustrated in FIG. 4D, the second row 412B of battery cell positions in the edge array 412 are perpendicularly offset from the first row 412A of battery cell positions in the Y-axis by a vertical distance, YC1. The battery cell positions in the edge array 412 may be arranged as orthogonal sets of immediately adjacent battery cell positions. In some embodiments, the X-axis battery cell positions and coordinates for the first row 412A may match the X-axis battery cell positions and coordinates for the second row 412B. This pattern provides an area 420, or open volume, between immediately adjacent sets of battery cell positions in the first and second rows 412A, 412B (e.g., battery cell positions 1, 2, 3, and 4). As provided above, the area 420 may be sized to receive a fastener, a fastening sleeve, structural adhesive 404, and/or a standoff internal to the entire array of battery cell positions making up the cell distribution pattern.

In some embodiments, the cell distribution pattern may include an internal array 416 comprising a number of rows 416A-C of battery cell positions that are staggered relative to one another. In one embodiment, the first staggered row 416A of the internal array 416 may be offset from the second row 412B of the edge array 412 by a vertical distance, YC2 (e.g., along the Y-axis, measured from the center of each position). As shown in FIG. 4D, the vertical distance, YC2, dimension between staggered rows 416A-C and the second row 412B immediately adjacent to the first staggered row 416A, is less than the vertical distance, YC1, dimension between battery cell positions in the edge arrays 412. Additionally, the battery cell positions of the first staggered row 416A may be offset in the X-axis from the battery cell positions in the edge array 412. In some embodiments, and as shown in FIG. 4D, battery cell position 5 (e.g., the first battery cell position in the first staggered row 416A of the internal array 416) may be offset from battery cell position 3 (e.g., the first battery cell position in the second row 412B of the edge array 412) by a horizontal distance, XC2 (e.g., along the X-axis, measured from the center of each position). In one embodiment, the horizontal distance, XC2, may correspond to half of the horizontal distance, XC1 (e.g., XC1 divided by two). The battery cell positions in each row 412A, 412B, 416A-C may be separated by the center-to-center horizontal distance, XC1. For instance, the distance between battery cell positions 5 and 6 may be equal to horizontal distance, XC1. As can be appreciated, the distance between battery cell positions 7 and 8, as well as 9 and 10, may also be equal to the horizontal distance, XC1. In any event, the battery cell positions of the second staggered row 416B of the internal array 416 may be offset in the X-axis from the battery cell positions of the first staggered row 416A of the internal array 416. In some embodiments, the battery cell positions of the second staggered row 416B of the internal array 416 may be inline (e.g., along the Y-axis) with at least some of the battery cell positions in the edge array 412. This staggered arrangement of battery cell positions in the internal array 416 provides a densely packed array of battery cells 208 in the battery module, while allowing spaces between the battery cells 208 in the two-dimensional inline edge arrays 412 for mounting hardware, sensors, structural adhesive 404, and/or the like, keeping the overall battery module 108 size to an optimized, condensed, and compact dimension.

As provided above, the vertical distance, YC1, dimension between battery cell positions in the first and second rows 412A, 412B in the edge array 412 may be measured from the center of battery cell position 1 (e.g., the first battery cell in the first row 412A) to the center of battery cell position 2 (e.g., the first battery cell in the second row 412B), along the Y-axis. This dimension, YC1 may correspond to the dimension of the outer periphery of the battery cell 208 plus a non-zero spacing dimension. The non-zero spacing dimension may set the distance between outer portions of immediately adjacent battery cells 208 at their closest position in the battery cell distribution pattern, such that no battery cells 208 are allowed to contact one another at their peripheries. By way of example, where the battery cells 208 have cylindrical casings, the dimension YC1 may be equal to two times the radius of each cylindrical battery cell 208 plus the non-zero spacing dimension (e.g., 0.5 mm to 1.0 mm, 1.0 mm to 2.0 mm, 2.0 mm to 3.0 mm, 3.0 mm to 4.0 mm, 4.0 mm to 7.0 mm, etc., combinations thereof, and/or ranges therebetween). In some embodiments, the horizontal distance, XC1, dimension may be similar, if not identical, to the vertical distance, YC1, dimension, except that the dimension is set along the X-axis.

The vertical distance, YC2, dimension between staggered rows may be less than the dimension of the outer periphery of the battery cell. Continuing the example above, where the battery cells 208 have cylindrical casings, the dimension YC2 may be equal to less than two times the radius of each cylindrical battery cell 208. In some embodiments, the spacing of the battery cell positions in the internal array 416 may provide an area 424, or open volume, between immediately adjacent sets of battery cell positions in the first staggered row 416A and the second row 412B and/or between immediately adjacent sets of battery cell positions in the staggered rows 416A-C. For instance, the area 424 may be disposed between sets of three adjacent battery cell positions in staggered rows (e.g., battery cell positions 3, 5, and 6, and/or battery cell positions 3, 4, and 6, and/or battery cell positions 5, 6, and 7, and/or battery cell positions 6, 7, and 8, etc.). As provided above, the area 424 may be sized to receive structural adhesive 404 and physically separate each battery cell 208 in the array of battery cells 208 for the battery module 108.

Figure 5A:
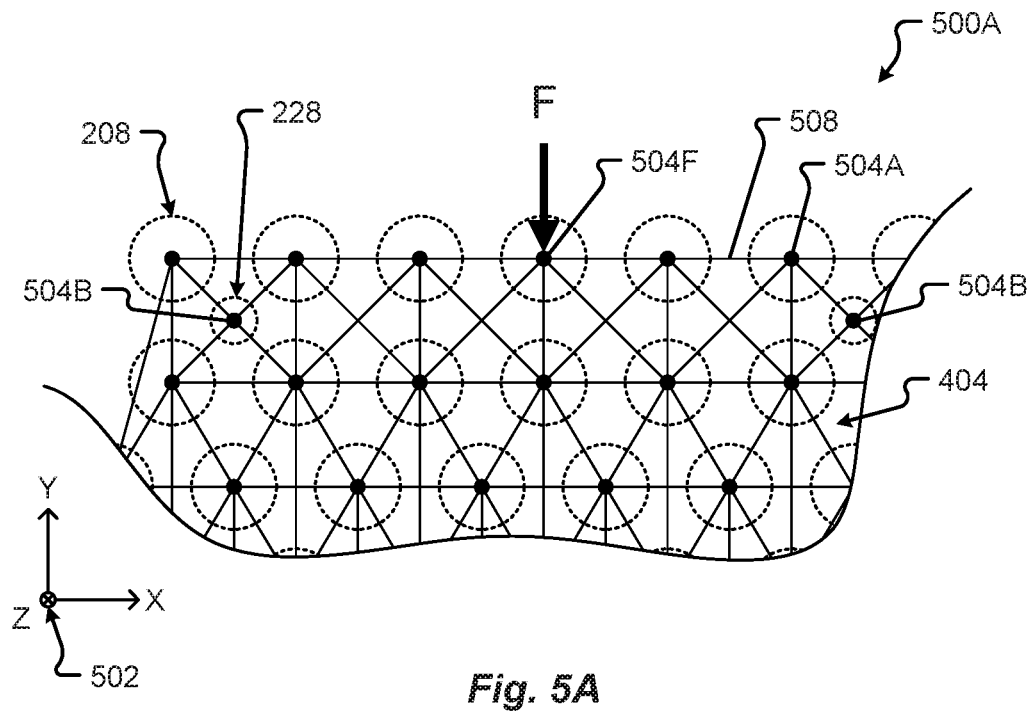
FIG. 5A shows a schematic representation of a force distribution framework of the battery module in a first state in accordance with embodiments of the present disclosure.
Figure 5B:
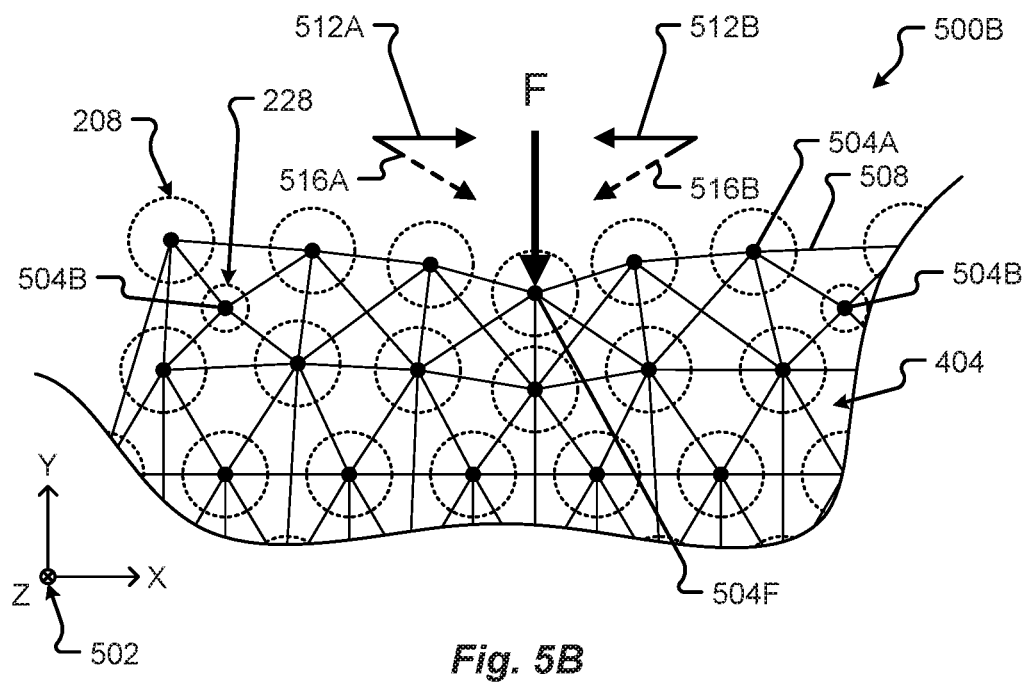
FIG. 5B shows a schematic representation of a force distribution framework of the battery module in a second state in accordance with embodiments of the present disclosure.

FIGS. 5A and 5B show schematic representations of a force distribution framework associated with the unified battery module 108 with integrated battery cell structural support at different impact states 500A, 500B in accordance with embodiments of the present disclosure. The force distribution framework shows a number of nodes 504A, 504B (e.g., representing battery cells 208 and mount sleeves 228, respectively, in the battery module 108, etc.) connected to one another via a number of connectors 508 (e.g., representing the structural adhesive 404). Although represented as a simplified number of nodes 504A, 504B, 504F and connectors 508 in FIGS. 5A and 5B, it should be appreciated that additional nodes may correspond to the edges and surfaces of the housing 212, the battery cell retaining form 218, the cooling plate 224, and/or other components making up the battery module 108. It should further be appreciated that additional connectors may exist between the surfaces of the components making up these additional nodes as well as the nodes 504A, 504B, 504F shown. However, for the sake of clarity in disclosure, the nodes 504A, 504B, 504F and connectors 508 shown have been represented in a simplified and schematic form. In some embodiments, the first nodes 504A may represent battery cells 208 that are held in position (e.g., in the X-Y plane of the representative coordinate system 502) at least via a lower housing 212A and a cover 212B. In one embodiment, it is an aspect of the present disclosure that the first nodes 504A may additionally be held in position (e.g., in the X-Y plane) via a battery cell retaining form 218.

FIG. 5A shows a schematic representation of a force distribution framework associated with the unified battery module 108 with integrated battery cell structural support at a pre-impact state 500A. As shown, in FIG. 5A a force, F, is about to act on a node 504F in the force distribution framework. This force, F, may represent an impact (e.g., from a collision, component shift, or other mechanical failure, etc.) in the form of a vector having a first magnitude and acting in the negative Y-direction (e.g., according to the representative coordinate system 502 shown). At this pre-impact state 500A, the nodes 504A, 504B, 504F of the framework are all maintained at relative distances to one another by the components of the battery module 108 and the structural adhesive 404 disposed therebetween.

As the force, F, contacts the node 504F in the force distribution framework, FIG. 5B shows the force, F, displacing the node 504F a specific distance in the negative Y-direction (e.g., pushing the node 504F closer to the next adjacent node 504A along the Y-axis, etc.) and the framework of nodes 504A, 504B, 504F and connectors 508 working in concert to resist the displacement imparted by the force, F. In particular, as the node 504F is displaced, the structural adhesive 404 under the node 504F acts in compression, while portions of the structural adhesive 404 between immediately adjacent nodes 504A along the X-axis to the Y-axis displacing node 504F may act in tension. For example, the immediately adjacent nodes 504A along the X-axis are brought closer to the Y-axis displacing node 504F in directions 512A, 512B (e.g., via a tension in the structural adhesive 404 between the immediately adjacent nodes 504A along the X-axis and the displacing node 504F). This tension may move the immediately adjacent nodes 504A in a resultant direction 516A, 516B (e.g., based on the X-axis directions 512A, 512B and the Y-axis displacement direction). In some embodiments, the force, F, may additionally cause the structural adhesive 404 to act in compression forcing the next adjacent nodes 504A along the Y-axis into a Y-axis displaced state. In any event, the structural adhesive 404 may be configured to provide a variable resistance as it is compressed and/or drawn out (e.g., stretched under tension). In some embodiments, all of the nodes and connectors in the battery module 108 force distribution framework may experience some movement (e.g., displacement) and/or absorb at least some of the force from the force, F. Distributing the impact force, F, among a large number, if not all, of the nodes 504A, 504B, 504F in the framework allows the battery module 108 to decrease a force observed at a point of contact (e.g., node 504F) while continuing to remain flexible in the X-Y plane.

FIG. 6 shows a perspective view of the battery cell retaining form 218 with several battery cells 208 disposed therein in accordance with embodiments of the present disclosure. In some embodiments, the battery cell retaining form 218 may comprise substantially planar first surface 608 offset, a height, H, from a substantially planar second surface 612. The battery cell retaining form 218 may include a number of sides 616A-D (sides 616C and 616D not shown), or sidewalls, disposed around a periphery of the form 218. The battery cell retaining form 218 may include an array of receptacles 604 formed through the first and second surfaces. In one embodiment, the array of receptacles 604 may be arranged, or formed, in the battery cell retaining form 218 in a battery cell distribution pattern. In some embodiments, the array of receptacles 604 formed in the battery cell retaining form 218 are sized to prevent uncured and/or cured structural adhesive 404 from expanding through the array of receptacles (e.g., as the structural adhesive cures in the housing 212), the structural adhesive 404 further mechanically joining the battery cell retaining form 218 as part of the unified and integral structure of the battery module 108.

Although shown as a substantially rectangular solid material, it should be appreciated that the battery cell retaining form 218 may be of any solid shape substantially conforming to an arrangement of the battery cells 208 in the housing 212 of the battery module 108. In any event, the battery cell retaining form 218 may include a length, L, extending from a first side 616A, along a second side 616B, to a third side 616C (not shown) (e.g., in the positive X-axis direction according to the representative coordinate system 602 shown) and a width, W, extending from the second side 616B along the first side 616A, to a fourth side 616D (not shown) (e.g., in the positive Y-axis direction according to the representative coordinate system 602 shown). In some embodiments, the height, H, may correspond to a distance measured between the first surface 608 and the opposing second surface 612 in the Z-axis direction. In one embodiment, the length, L, width, W, and height, H, may define a volume of the battery cell retaining form 218. The volume of the battery cell retaining form 218 may be sized to fit within at least one containment cavity of the housing 212 (e.g., lower housing 212A, cover 212B, and/or combinations thereof).

In some embodiments, the battery cell retaining form 218 may be made from a foam, plastic, or other lightweight dielectric material (e.g., low-density rigid foam, closed-cell foam, open-cell foam, molded plastic, composites, etc.). The receptacles 604 may be die cut, wire electrical discharge machined (EDM) cut, machined, molded, or otherwise formed through the battery cell retaining form 218. It is an aspect of the present disclosure that the number of receptacles 604, or battery receiving features, in the battery cell retaining form 218 match the number of battery cells 208 in the battery module 108.

Figure 7A:
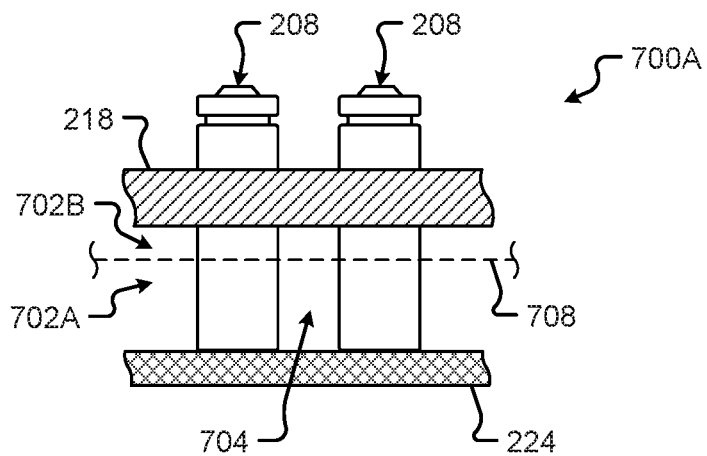
FIG. 7A shows a battery cell retaining form and/or gasket in a first assembly state in accordance with embodiments of the present disclosure.
Figure 7B:
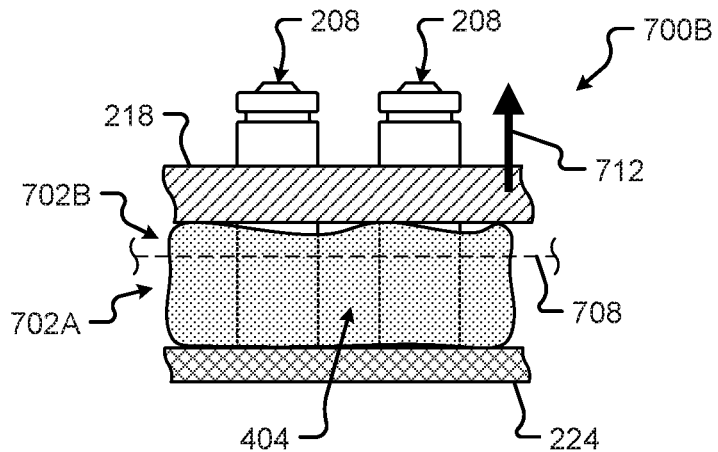
FIG. 7B shows a battery cell retaining form and/or gasket in a second assembly state in accordance with embodiments of the present disclosure.
Figure 7C:
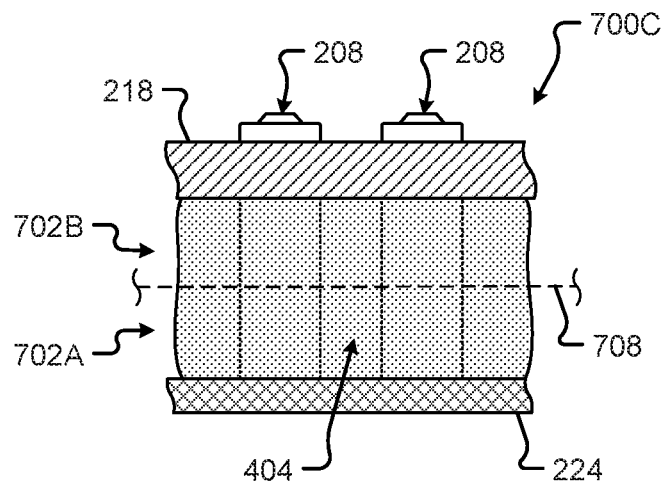
FIG. 7C shows a battery cell retaining form and/or gasket in a third assembly state in accordance with embodiments of the present disclosure.

Referring now to FIGS. 7A-7C, a detail broken section view of adjacent battery cells 208 held in the receptacles 604 of a battery cell retaining form 218 disposed inside a battery module 108 is shown at various stages 700A-C of assembly in accordance with embodiments of the present disclosure. The battery cells 208 are shown held in place, at least partially, via the battery cell retaining form 218. In some embodiments, a surface of each battery cell 208 (e.g., the bottom) may be placed into contact with a cooling plate 224. The cooling plate 224 may be configured to convey a coolant or other fluid therethrough, thereby cooling at least one surface of the cooling plate and objects (e.g., battery cells 208, etc.) in contact with the at least one surface. In one embodiment, the battery cells 208 may be mechanically adhered to the cooling plate 224 via a thermally conductive adhesive material. In some embodiments, the thermally conductive adhesive material may include mechanical separation elements embedded therein (e.g., beads, etc.), configured to separate the lowest surface of the battery cells 208 from the cooling plate 224 surface a known distance. Among other things, this separation may provide a predictable thermal conductive path between the cooling plate 224 and the battery cells 208 via the thermally conductive adhesive material. As described above, the base of the module 108, the carrier 212, and/or one or more battery cells 208 may be bonded to the cooling plate 224 using a structural adhesive that provides a thermal conductor (e.g., thermal interface material), and a di-electric barrier between the various elements and the cooling plate 224.

The detail broken section view shows a split line 708 representing the lines where a lower housing 212A may meet, or otherwise interconnect, with a cover 212B. As can be appreciated, the split line 708 delineates between the first containment cavity space 702A (e.g., of the lower housing 212A) and the second containment cavity space 702B (e.g., of the cover 212B) of the housing 212. A filling space, or volume, 704 disposed between adjacent battery cells 208 is shown in FIG. 7A. In some embodiments, the structural adhesive 404 may be deposited (e.g., in a fluid, or semi-fluid state) into this filling volume 704 such that the structural adhesive 404 may evenly distribute and disperse between all of the battery cells 208 in the battery module 108.

FIG. 7A shows a battery cell retaining form 218 in a first assembly state 700A (e.g., the pre-fill stage) in accordance with embodiments of the present disclosure. In FIG. 7A, the battery cell retaining form 218 has been disposed toward an upper portion (e.g., the positive terminal end) of the battery cells 208. In some embodiments, the battery cell retaining form 218 may be contained inside the first containment cavity space 702A prior to filling with structural adhesive 404. In one embodiment, the battery cell retaining form 218 may be biased to be adjacent to the split line 708 of the housing 212 prior to filling the battery module 108 and the filling volume 704 with structural adhesive 404.

In some embodiments, the structural adhesive 404 may be inserted into the filling volume 704 in a volume at least partially enclosed by an attached lower housing 212A and cover 212B. The lower housing 212A and the cover 212B may be attached via an adhesive connection, or adhesive layer 406, disposed on the flanged surface 408A and/or the mating flanged surface 408B. In some cases, this structural adhesive 404 may remain in place after the filling volume 704 is filled mechanically connecting the lower housing 212A to the cover 212B.

FIG. 7B shows the battery cell retaining form 218 in a second assembly state 700B (e.g., the initial fill stage) in accordance with embodiments of the present disclosure. As the structural adhesive 404 is inserted, pumped, or otherwise deposited into the filling volume 704 between the battery cells 208, the hydraulic force of the material filling and/or expanding in the first containment cavity space 702A may force the battery cell retaining form 218 in an upward direction 712 toward the upper portion of the battery cells 208.

FIG. 7C shows the battery cell retaining form 218 in a third assembly state 700C (e.g., the fill-cured stage) in accordance with embodiments of the present disclosure. Once the appropriate amount of structural adhesive 404 is inserted into the filling volume 704 (e.g., based on a volumetric dispense, mass dispense, etc., and/or combinations thereof, the battery cell retaining form 218 will cease to displace, or move, in the upward direction 712. In some embodiments, the battery cell retaining form 218 may provide a space between the uppermost surface of the form 218 and the upper end, or top, of the battery cell 208. This space may provide working area for making electrical interconnections, inserting other materials, and/or the like. In some embodiments, the battery cell retaining form 218 may compress between the cured structural adhesive 404 and the inside planar surface of the cover 212B. In this example, the substantially planar first surface 608 of the form 218 may contact the inside upper surface of the cover 212B, while the substantially planar second surface 612 of the form 218 may contact the structural adhesive 404. This compression of the form 218 may allow for a tolerance in expansion of the structural adhesive 404 when curing. For instance, if the structural adhesive 404 has an estimated expansion volume of 20% greater than the original amount of fluid +/−5%, the battery cell retaining form 218 may be configured to compress an amount to accommodate the +5% expansion, +10% expansion, and/or more. In any event, once the structural adhesive 404 cures, and hardens into a solid or semi-solid state, the battery cells 208, the cold plate 224, and the battery cell retaining form 218 are joined together by the structural adhesive 404, forming an integral and unified battery module 108 assembly.

Figure 8A:
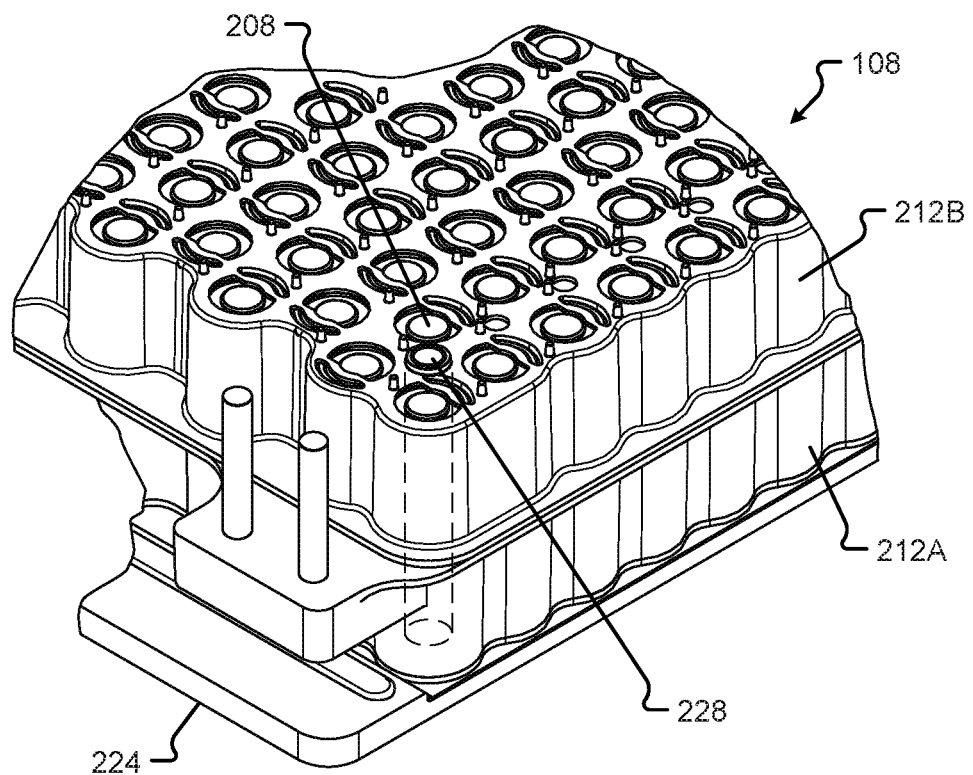
FIG. 8A shows a perspective view of a dielectric mount sleeve disposed between battery cells in a battery module in accordance with embodiments of the present disclosure.

FIG. 8A shows a perspective view of a dielectric mount sleeve 228 disposed between adjacent battery cells 208 in a battery module 108 in accordance with embodiments of the present disclosure. As shown in FIG. 8A, the upper shield 204, fastener 804, and other components have been removed for clarity. In some embodiments, the dielectric mount sleeve 228 may fasten the battery module 108 together and/or attach the battery module 108 to a vehicle mount base (see, e.g., mount base 812 of FIG. 8B). The dielectric mount sleeve 228 may be made from Garolite G10, fiberglass, ceramic coated materials, fiberglass-epoxy laminates, etc. As shown in FIG. 8A, the dielectric mount sleeves 228 may be disposed internal to a periphery of the battery module 108 and between battery cells 208. Among other things, this arrangement may allow for a more compact battery module 108 and one that does not require external clamping and/or fastening features.

Figure 8B:
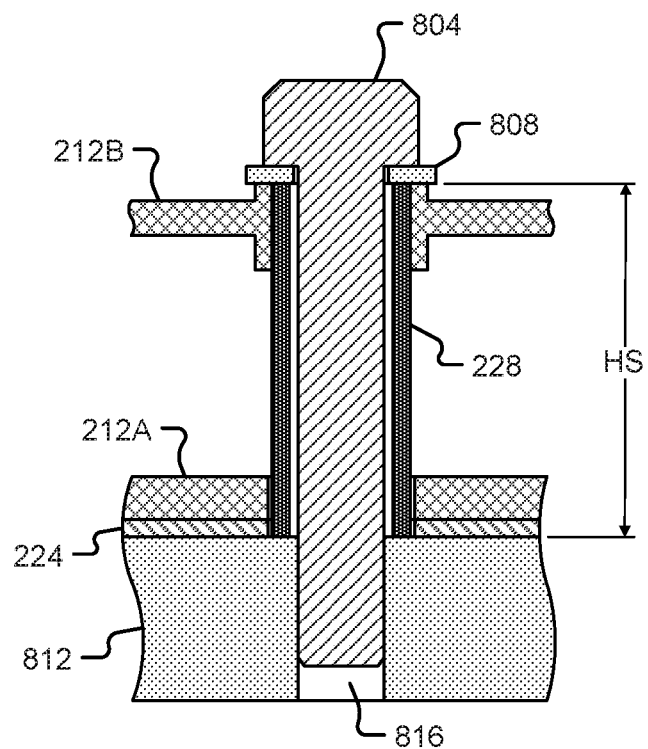
FIG. 8B shows a detail elevation section view of the dielectric mount sleeve of FIG. 8A.

FIG. 8B shows a detail elevation section view of the dielectric mount sleeve 228 of FIG. 8A. The dielectric mount sleeve 228 may be configured as a hollow shaft, having a total height, HS. The height, HS, of the dielectric mount sleeve 228 may define the maximum height from the cover 212B to the bottom of the cooling plate 224 and may even define the height of the battery module 108. In some cases, a fastener 804 may be inserted into the hollow shaft of the dielectric mount sleeve 228 and into a receiving feature 816 in, or associated with, the mount base 812. In some embodiments, this receiving feature 816 may be a nut, threaded hole, and/or some other mating interconnection between the mount base 812 and the fastener 804. In one embodiment, the fastener may be used to hold the upper shield 204 and other battery module 108 components together. Although shown as a washer 808, or other load distributing member, in contact with the cover 212B in FIG. 8B, it should be appreciated that the washer 808, or even the head of the fastener 804, may apply a compressive, or clamping, force to the upper shield 204 holding the housing 212 components (e.g., lower housing 212A, cover 212B, etc.) together between the cooling plate 224 and the upper shield 204.

As illustrated in FIG. 8B, as a force is applied to the fastener 804, providing a clamping load for the battery module 108, the load transmits to the dielectric mount sleeve 228 rather than the housing 212 and other battery module 108 components alone. In some embodiments, the load or compressive force imparted by overtightening the assembly fastener 804 may be resisted by the dielectric fastening sleeve 228 such that the lower housing 212A and cover 212B of the battery module 108 do not, and cannot, substantially deform, crack, or bend.

Figure 9A:
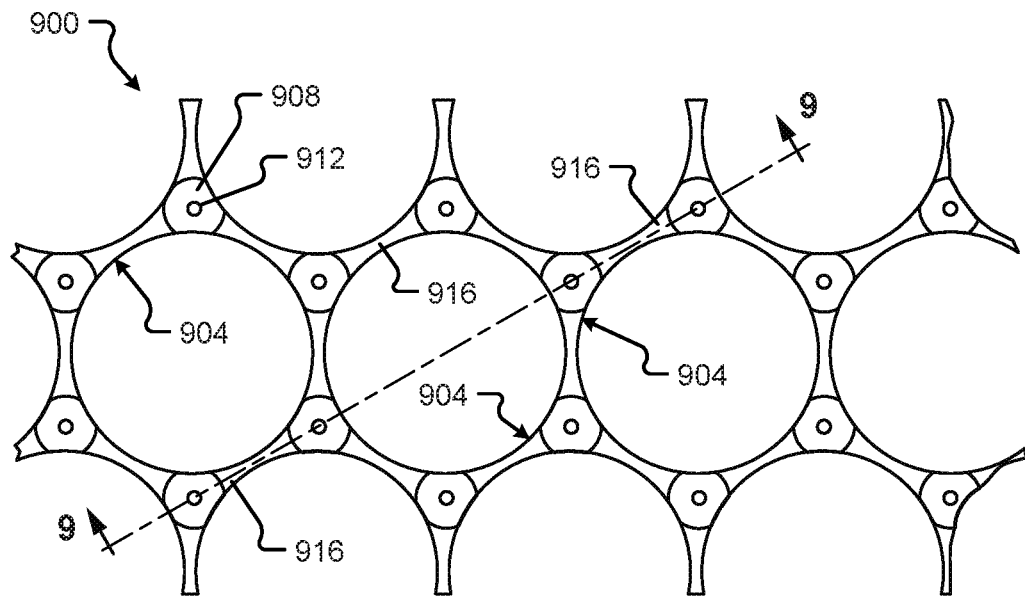
FIG. 9A shows a detail broken plan view of the battery cell location frame in accordance with embodiments of the present disclosure.

FIG. 9A shows a detail broken plan view of a battery cell location frame 900 in accordance with embodiments of the present disclosure. In some embodiments, the battery cell location frame 900 may be configured as a mechanical frame to maintain the battery cells 208 of the battery module 108 in the cell distribution pattern as described in conjunction with FIGS. 4C and 4D. For example, the receptacles 904 formed in the battery cell location frame 900 may be arranged in accordance with the cell distribution pattern configured to space apart and/or align the battery cells 208 in the battery module 108. The battery cell location frame 900 may be a part of the battery module 108 and/or integrally formed in a portion of the housing 212. For instance, and as shown in FIG. 4B, the battery cell location frame 900 may be formed in the lower housing 212A. Additionally or alternatively, the battery cell location frame 900 may be integrally formed in the cover 212B.

The battery cell location frame 900 may comprise a substantially planar substrate, through which, an array of receptacles 904 are formed. The receptacles 904 may be configured as a through-hole, or aperture, passing completely through a thickness of the substantially planar substrate. These receptacles 904 may each be sized to receive, and/or position, a battery cell 208 in the array of battery cells 208 in the battery module 108. In some embodiments, each of the receptacles 904 may be sized to receive a battery cell 208 with a slip fit. For example, the receptacles 904 may be sized at a dimension to accommodate the outer peripheral dimension of a battery cell 208 plus a tolerance (e.g., the battery cell periphery dimension plus +0.05 mm to +0.50 mm, etc.) allowing for a noninterference fit between the battery cell 208 and the receptacle 904. In some embodiments, the slip fit tolerance may be sized, set, or increased (e.g., the battery cell periphery dimension plus +0.50 mm to +1.50 mm, etc.) to include space for receiving structural adhesive 404, contact adhesive, or other material.

At the periphery of each receptacle 904, one or more protrusions 908 may extend a distance from the substantially planar substrate. This distance can provide an offset from a contacting plate or surface of the battery module 108 and may even provide one or more areas for structural adhesive 404 or other material to collect and/or adhere. The protrusions 908 may include a recess 912 configured as a receptacle, hole, blind hole, or through-hole. In any event, the recess 912 may be configured to receive structural adhesive 404, contact adhesive, two-part epoxy, time-cured adhesive, or other material providing an enhanced surface area contact between the battery cell location frame 900 and the mating materials. Once the receptacles 904 are formed in the battery cell location frame 900, the battery cell location frame 900 may comprise a number of bridges 916 between the protrusions 908 extending from the substantially planar substrate.

Figure 9B:
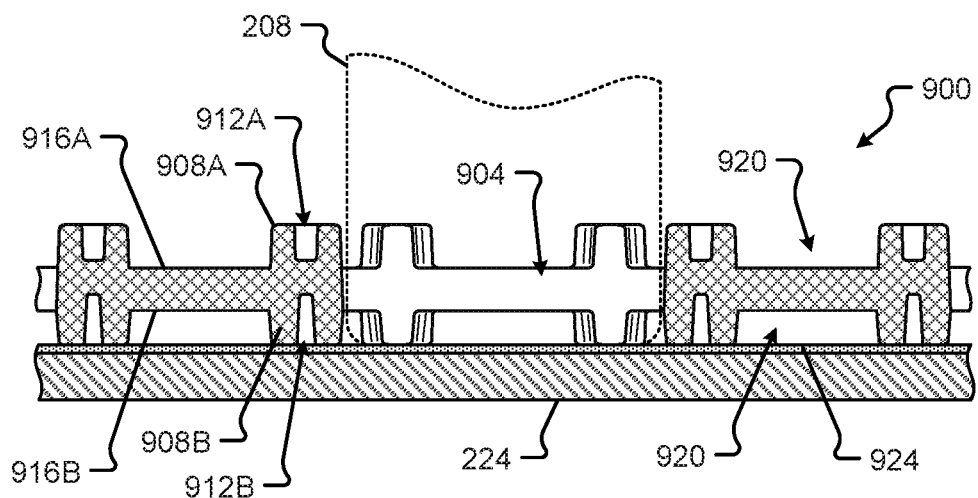
FIG. 9B shows a detail broken section elevation view of the battery cell location frame of FIG. 9A.

FIG. 9B shows a detail broken section elevation view of the battery cell location frame 900 of FIG. 9A. In particular, the section shown in FIG. 4B may be taken through line 9-9 shown in FIG. 9A. As shown in FIG. 9B, the battery cell location frame 900 may include a number of receptacles 904 configured to receive and/or position a battery cell 208. The battery cell location frame 900 in FIG. 9B is shown in contact with an adhesive layer 924 and a cooling plate 224. In some embodiments, the adhesive layer 924 may be a thermally conductive adhesive layer disposed between the battery cell location frame 900 and the cooling plate 224. The battery cell location frame 900 may include a substantially planar substrate having a first planar surface 916A and a second planar surface 916B offset from the first planar surface 916A by a thickness of the substantially planar substrate. As provided above, the receptacles 904 may be formed through the substantially planar substrate shown in FIG. 9B.

Shown at the peripheries of the receptacles 904, the protrusions 908 may be disposed on the first and/or second planar surfaces 916A, 916B between sets, or at the geometric center, of immediately adjacent receptacles 904 representing immediately adjacent battery cell positions in the battery cell distribution pattern. As shown in FIGS. 9A and 9B, the protrusions 908 may be disposed between sets, or at the geometric center, of three immediately adjacent receptacles 904 in staggered rows of the cell distribution pattern. The protrusions 908 shown in FIG. 9B, include a first protrusion 908A extending from the battery cell location frame 900 and offset a first distance from the first planar surface 916A in a direction opposite the second planar surface 916B, wherein the first protrusion 908A is disposed at a periphery of at least one of the plurality of receptacles 904. Additionally or alternatively, the protrusions 908 may include a second protrusion 908B extending from the battery cell location frame 900 and offset a distance from the second planar surface 916B in a direction opposite the first planar surface 916A, wherein the second protrusion 908B is disposed at a periphery of at least one of the plurality of receptacles 904.

In one embodiment, the first protrusion 908A may include a first recess 912A configured as a hole extending from an exterior surface of the first protrusion 908A a depth toward the first planar surface 916A of the substantially planar substrate. Additionally or alternatively, the second protrusion 908B may include a second recess 912B configured as a hole extending from an exterior surface of the second protrusion 908B a depth toward the second planar surface 916B of the substantially planar substrate. In some embodiments, the first and/or second recesses 912A, 912B may be configured as a through-hole extending completely through the first and/or second protrusions 908A, 908B. Providing a through-hole recess 912 extending through the protrusions 912 can allow for material (e.g., structural adhesive, contact or other adhesive, etc., and/or some other material) to enter the recess 912 with little resistance and easy displacement of air during assembly of the battery cell location frame 900 with other components of the battery module 108.

The first and/or second protrusions 908A, 908B may provide one or more adhesive areas 920 configured to receive structural adhesive 404. These adhesive areas 920 may provide enhanced surface contact areas between the structural adhesive 404, the battery cell location frame 900, and the battery cells 208 positioned therein. For instance, the adhesive areas 920 disposed between the battery cell location frame 900 and the adhesive layer 924/cooling plate 224 (e.g., on the second protrusion 908B side of the frame 900) provides an enhanced adhesive contact between the components in the battery module 108. Moreover, the adhesive areas 920 disposed under each bridge 916 allows the structural adhesive 404 to flow between these spaces and interconnect to each battery cell 208 therein forming the interconnected framework of adhered battery cells 208. In some embodiments, the clearance, or adhesive areas 920, under each bridge in the battery cell location frame 900 create a material flow path through which material (e.g., adhesive, etc.) may spread and disperse during assembly. Without these adhesive areas 920 (e.g., if the second protrusions 908B did not exist), the structural adhesive 404 would be unable to flow between battery cells 208 in the battery cell location frame 900 and the battery cells 208 would not be connected in the framework at the lowermost portion of each battery cell 208. As provided above, the battery cell location frame 900 may be integrated into (e.g., integrally formed in, etc.) a base portion of the lower housing 212A, an upper portion of the cover 212B, and/or be maintained as a separate component that fits within the housing 212. In any event, the battery cell location frame 900 may be made from plastic, composite, or other electrically nonconductive or insulative material, etc.

The exemplary systems and methods of this disclosure have been described in relation to a battery module 108 and a number of battery cells 208 in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a battery module, comprising: a housing comprising a base and sidewalls extending from a periphery of the base, the base and sidewalls defining a first containment cavity having a first volume, wherein the base comprises a plurality of receptacles formed therein, the plurality of receptacles arranged in a battery cell distribution pattern, and wherein each receptacle in the plurality of receptacles is sized to receive a battery cell; an array of battery cells at least partially disposed within the first volume, the array of battery cells comprising base portions disposed in the plurality of receptacles of the housing and arranged in the battery cell distribution pattern providing an open volume surrounding each battery cell in the array of battery cells; and a structural adhesive disposed in the first volume of the housing and around each battery cell in the array of battery cells, the structural adhesive filling the open volume surrounding each battery cell and mechanically coupling each battery cell in the array of battery cells together in a force distribution framework.

Aspects of the above battery module further comprise a cover comprising an upper surface and walls extending from a periphery of the upper surface, the walls and upper surface defining a second containment cavity having a second volume, wherein the cover is attached to the housing along at peripheral contacting surfaces of the walls and sidewalls, wherein upper portions of the array of battery cells are at least partially disposed in the second volume of the cover, wherein the upper portions of the array of battery cells are disposed opposite the base portions of the array of battery cells. Aspects of the above battery module include wherein the cover comprises a plurality of receptacles formed in the upper surface and arranged in the battery cell distribution pattern, wherein each receptacle in the plurality of receptacles formed in the upper surface is sized to receive a battery cell in the array of battery cells. Aspects of the above battery module include wherein the sidewalls of the housing include a flanged surface following at least a portion of the periphery of the base, the flanged surface offset from and substantially parallel to the base, wherein the walls of the cover include a mating flanged surface configured to mate with the flanged surface of the housing. Aspects of the above battery module include wherein the cover is temporarily attached to the housing via an adhesive layer disposed between the flanged surface of the sidewalls and the mating flanged surface of the cover, and wherein each battery cell in the array of battery cells is held in the battery cell distribution pattern via the plurality of receptacles formed in the base of the housing and the upper surface of the cover. Aspects of the above battery module include wherein the structural adhesive contacts surfaces of the sidewalls of the housing and the walls of the cover mechanically joining the housing, cover, and battery cells in the array of battery cells into a unified and integral structure. Aspects of the above battery module further comprise a battery cell retaining form comprising a substantially planar surface including an array of receptacles formed therethrough, the array of receptacles formed in the battery cell distribution pattern and configured to receive at least a portion of the array of battery cells. Aspects of the above battery module further comprise a dielectric fastening sleeve disposed between four adjacent battery cells in the array of battery cells, the dielectric fastening sleeve comprising a hollow shaft extending longitudinally from the upper surface of the cover through the base of the housing to a mount frame, the hollow shaft configured to receive an assembly fastener, wherein the battery module is fastened to a mount frame via the assembly fastener, and wherein a height of the hollow shaft defines a height of the battery module. Aspects of the above battery module include wherein a load or compressive force imparted by overtightening the assembly fastener is resisted by the dielectric fastening sleeve such that the housing and cover of the battery module do not substantially deform.

Embodiments include an energy storage device, comprising: a plurality of energy storage cells arranged in a number of spaced apart linear rows, wherein each energy storage cell in the plurality of storage cells is spaced apart from one another providing an open volume surrounding each energy storage cell; a carrier comprising a plurality of sidewalls and an upper and lower surface, the carrier including an internal void, wherein the plurality of energy storage cells are disposed at least partially within the internal void of the carrier; and a structural adhesive disposed in the internal void of the carrier, the structural adhesive filling the open volume surrounding each energy storage cell and at least a portion of the internal void of the carrier, the structural adhesive mechanically coupling each energy storage cell in the plurality of energy storage cells and the carrier together in a force distribution framework.

Aspects of the above energy storage device further comprise a cover forming the upper surface and a first portion of the plurality of sidewalls, wherein the first portion of the plurality of sidewalls extend from a periphery of the upper surface, the first portion of the plurality of sidewalls and upper surface defining a first volume of the internal void; and a housing forming the lower surface and a second portion of the plurality of sidewalls, wherein the second portion of the plurality of sidewalls extend from a periphery of the lower surface, the second portion of the plurality of sidewalls and upper surface defining a second volume of the internal void, wherein the first portion of the plurality of sidewalls are connected to the second portion of the plurality of sidewalls via mating flanged surfaces following at least a portion of the periphery of the carrier, the flanged surfaces being offset from and substantially parallel to the upper and lower surfaces. Aspects of the above energy storage device further comprising an adhesive layer disposed between and in contact with the mating flanged surfaces of the first and second portions of the plurality of sidewalls. Aspects of the above energy storage device include wherein the structural adhesive contacts surfaces of the plurality of sidewalls in the internal void of the carrier and external surfaces of each energy storage cell in the plurality of energy storage cells mechanically joining the carrier and energy storage cells in the plurality of energy storage cells into a unified and integral structure. Aspects of the above energy storage device include wherein the energy storage devices are one or more of battery cells, capacitors, supercapacitors, and/or ultracapacitors. Aspects of the above energy storage device further comprising: a retaining form gasket comprising a substantially planar surface including receptacles arranged in the number of spaced apart linear rows and formed completely through the retaining form gasket, wherein each receptacle is sized to receive a portion of each energy storage cell in the plurality of energy storage cells in the energy storage device. Aspects of the above energy storage device include wherein the retaining form gasket maintains the plurality of energy storage cells in a position spaced apart from one another, and wherein the retaining form gasket is disposed in the first volume of the internal void. Aspects of the above energy storage device further comprising: a nonconductive standoff disposed between four adjacent energy storage cells in the plurality of energy storage cells, the nonconductive standoff comprising a hollow shaft extending longitudinally from the upper surface of the carrier through the lower surface of the carrier to a surface of a mount frame, the hollow shaft receiving a fastener clamping the carrier and plurality of energy storage cells to the mount frame, wherein a height of the hollow shaft defines a height of the energy storage device, and wherein the structural adhesive contacts a surface of the nonconductive standoff mechanically joining the nonconductive standoff in the unified and integral structure of the energy storage device.

Embodiments include a battery for an electric vehicle, comprising: a plurality of battery modules electrically interconnected with one another, wherein each battery module of the plurality of battery modules comprises: a housing comprising a base and sidewalls extending from a periphery of the base, the sidewalls and base defining a first containment cavity having a first volume, wherein the base comprises a plurality of receptacles formed therein, the plurality of receptacles arranged in a battery cell distribution pattern, and wherein each receptacle in the plurality of receptacles is sized to receive a battery cell; an array of battery cells at least partially disposed within the first volume, the array of battery cells comprising base portions disposed in the plurality of receptacles of the housing and arranged in the battery cell distribution pattern providing an open volume surrounding each battery cell in the array of battery cells; and a structural adhesive disposed in the first volume of the housing and around each battery cell in the array of battery cells, the structural adhesive filling the open volume surrounding each battery cell mechanically coupling each battery cell in the array of battery cells together in a force distribution framework.

Embodiments include a battery module, comprising: an array of battery cells arranged in a battery cell distribution pattern comprising a two-dimensional pattern, the two-dimensional pattern comprising: a first row including a plurality of battery cell positions equispaced substantially in a first spacing along a first linear path extending in a first direction, the first row defining an outermost position for battery cells in the array of battery cells disposed along a first outer edge of the battery module; a second row offset a first distance from the first row in a second direction perpendicular to the first direction, wherein the second row includes a plurality of battery cell positions equispaced substantially in the first spacing along a second linear path extending in the first direction, wherein each of the plurality of battery cell positions in the second row are perpendicularly inline with each of the plurality of battery cell positions in the first row; and a staggered third row offset a second distance from the second row in the second direction, wherein the second distance is less than the first distance, wherein the staggered third row includes a plurality of battery cell positions equispaced substantially in the first spacing along a third linear path extending in the first direction, wherein the plurality of battery cell positions in the staggered third row are offset in the first direction relative to the plurality of battery cell positions in the first and second rows such that the battery cell positions in the staggered third row are not inline with the plurality of battery cell positions in the first and second rows.

Aspects of the above battery module include wherein a first open volume is disposed between adjacent battery cells arranged in the first and second rows, wherein a second open volume is disposed between adjacent battery cells arranged in the second and third rows, and wherein the first open volume is greater than the second open volume. Aspects of the above battery module include wherein the first open volume is configured to receive one or more of a fastener, a fastening sleeve, and/or a standoff of the battery module without contacting any battery cell in the array of battery cells. Aspects of the above battery module include wherein each of the battery cell positions includes a battery cell and wherein each battery cell in the array of battery cells is separated from immediately adjacent battery cells via a spacing open volume. Aspects of the above battery module further comprising: a battery cell location frame, comprising: a substantially planar substrate having a first thickness extending from a first planar surface of the substrate to an opposing second planar surface of the substrate, wherein the substrate comprises a plurality of receptacles formed through the first thickness and arranged in the battery cell distribution pattern, wherein each receptacle in the plurality of receptacles formed through the first thickness is sized to receive a corresponding battery cell of the array of battery cells. Aspects of the above battery module include wherein the battery cell location frame further comprises: a first protrusion extending from the battery cell location frame and offset a first distance from the first planar surface in a direction opposite the second planar surface, wherein the first protrusion is disposed at a periphery of at least one of the plurality of receptacles. Aspects of the above battery module include wherein the battery cell location frame further comprises: a second protrusion extending from the battery cell location frame and offset a second distance from the second planar surface in a direction opposite the first planar surface, wherein the second protrusion is disposed at the periphery of at least one of the plurality of receptacles. Aspects of the above battery module include wherein the first protrusion and/or the second protrusion includes a recess extending from a contact surface of the first and/or second protrusion a depth into the first and/or second protrusion. Aspects of the above battery module further comprising: a housing comprising a cavity having a first volume configured to receive at least a portion of the array of battery cells. Aspects of the above battery module further comprising: a cover comprising a containment cavity having a second volume configured to receive at least a second portion of the array of battery cells, wherein the cover is interconnected to the housing along peripheral contacting surfaces of the housing. Aspects of the above battery module include wherein the battery cell location frame is integrally formed in the housing and/or the cover. Aspects of the above battery module further comprising: a structural adhesive disposed in the first volume of the housing and around each battery cell in the array of battery cells, the structural adhesive filling the spacing open volume and the area surrounding each battery cell mechanically coupling each battery cell in the array of battery cells together in a force distribution framework. Aspects of the above battery module include wherein the structural adhesive is disposed in the recess of the first and/or second protrusion, in an area between the first protrusion and the first planar surface, and/or in an area between the second protrusion and the second planar surface.

Embodiments include an energy storage device, comprising: a plurality of energy storage cells arranged in a cell distribution pattern, the cell distribution pattern comprising: a first terminal array disposed at a first edge of the energy storage device; a second terminal array disposed at a second edge side of the energy storage device, the second edge disposed opposite the first edge; and a center storage cell array disposed between the first and second edges of the energy storage device; wherein the first and second terminal arrays each comprise pairs of energy storage cell positions offset from one another in a first line defining a first direction, the pairs of energy storage cell positions repeating along a linear path running in a second direction perpendicular to the first direction, and wherein the center storage cell array comprises a first row of energy storage cell positions offset in the first and second directions from the pairs of energy storage cell positions in the first and second terminal arrays.

Aspects of the above energy storage device include wherein the center storage cell array comprises a second row of energy storage cell positions offset in the first direction and not offset in the second direction from the pairs of energy storage cell positions in the first and second terminal arrays. Aspects of the above energy storage device include wherein a first open volume is disposed between sets of four immediately adjacent energy storage cells arranged in the first and/or second terminal array, wherein a second open volume is disposed between adjacent energy storage cells arranged in the center storage cell array, and wherein the first open volume is greater than the second open volume. Aspects of the above energy storage device include wherein the first open volume is configured to receive one or more of a fastener, a fastening sleeve, and/or a standoff of the energy storage device without contacting any energy storage cell in the array of energy storage cells. Aspects of the above energy storage device further comprising: an energy storage cell location frame, comprising: a substantially planar substrate having a first thickness extending from a first planar surface of the substrate to an opposing second planar surface of the substrate, wherein the substrate comprises a plurality of receptacles formed through the first thickness and arranged in the cell distribution pattern, wherein each receptacle in the plurality of receptacles formed through the first thickness is sized to receive an energy storage cell of the plurality of energy storage cells. Aspects of the above energy storage device include wherein the energy storage cell location frame further comprises: a first protrusion extending from the energy storage cell location frame and offset a first distance from the first planar surface in a direction opposite the second planar surface, wherein the first protrusion is disposed at a periphery of at least one of the plurality of receptacles; and a second protrusion extending from the energy storage cell location frame and offset a second distance from the second planar surface in a direction opposite the first planar surface, wherein the second protrusion is disposed at the periphery of at least one of the plurality of receptacles, wherein the first protrusion and/or the second protrusion includes a recess extending from a contact surface of the first and/or second protrusion a depth into the first and/or second protrusion.

Embodiments include a battery for an electric vehicle, comprising: a plurality of battery modules electrically interconnected with one another, wherein each battery module of the plurality of battery modules comprises an array of battery cells arranged in a battery cell distribution pattern comprising a two-dimensional pattern comprising: a first row including a plurality of battery cell positions equispaced substantially in a first spacing along a first linear path extending in a first direction, the first row defining an outermost position for battery cells in the array of battery cells disposed along a first outer edge of the battery module; a second row offset a first distance from the first row in a second direction perpendicular to the first direction, wherein the second row includes a plurality of battery cell positions equispaced substantially in the first spacing along a second linear path extending in the first direction, wherein each of the plurality of battery cell positions in the second row are perpendicularly inline with each of the plurality of battery cell positions in the first row; and a staggered third row offset a second distance from the second row in the second direction, wherein the second distance is less than the first distance, wherein the staggered third row includes a plurality of battery cell positions equispaced substantially in the first spacing along a third linear path extending in the first direction, wherein the plurality of battery cell positions in the staggered third row are offset in the first direction relative to the plurality of battery cell positions in the first and second rows such that the battery cell positions in the staggered third row are not inline with the plurality of battery cell positions in the first and second rows.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, microcode, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A battery module, comprising:
    an array of battery cells arranged in a battery cell distribution pattern comprising a two-dimensional pattern, the two-dimensional pattern comprising:
        a first row including a plurality of battery cell positions equispaced substantially in a first spacing along a first linear path extending in a first direction, the first row defining an outermost position for battery cells in the array of battery cells disposed along a first outer edge of the battery module;
        a second row immediately adjacent to and offset a first distance from the first row in a second direction perpendicular to the first direction, wherein the second row includes a plurality of battery cell positions equispaced substantially in the first spacing along a second linear path extending in the first direction, wherein each of the plurality of battery cell positions in the second row are perpendicularly inline along the second direction with each of the plurality of battery cell positions in the first row; and
        a staggered third row immediately adjacent to and offset a second distance from the second row in the second direction, wherein the second distance is less than the first distance, wherein the staggered third row includes a plurality of battery cell positions equispaced substantially in the first spacing along a third linear path extending in the first direction, wherein the plurality of battery cell positions in the staggered third row are offset in the first direction relative to the plurality of battery cell positions in the first and second rows such that the battery cell positions in the staggered third row are not inline along the second direction with the plurality of battery cell positions in the first and second rows.

2. The battery module of claim 1, wherein a first open volume is disposed between adjacent battery cells arranged in the first and second rows, wherein a second open volume is disposed between adjacent battery cells arranged in the second and third rows, and wherein the first open volume is greater than the second open volume.

3. The battery module of claim 2, wherein the first open volume is configured to receive one or more of a fastener, a fastening sleeve, and/or a standoff of the battery module without contacting any battery cell in the array of battery cells.

4. The battery module of claim 3, wherein each of the battery cell positions includes a battery cell and wherein each battery cell in the array of battery cells is separated from immediately adjacent battery cells via a spacing open volume.

5. The battery module of claim 4, further comprising:
    a battery cell location frame, comprising:
    a substantially planar substrate having a first thickness extending from a first planar surface of the substrate to an opposing second planar surface of the substrate, wherein the substrate comprises a plurality of receptacles formed through the first thickness and arranged in the battery cell distribution pattern, wherein each receptacle in the plurality of receptacles formed through the first thickness is sized to receive a corresponding battery cell of the array of battery cells.

6. The battery module of claim 5, wherein the battery cell location frame further comprises:
    a first protrusion extending from the battery cell location frame and offset a first distance from the first planar surface in a direction opposite the second planar surface, wherein the first protrusion is disposed at a periphery of at least one of the plurality of receptacles.

7. The battery module of claim 6, wherein the battery cell location frame further comprises:
    a second protrusion extending from the battery cell location frame and offset a second distance from the second planar surface in a direction opposite the first planar surface, wherein the second protrusion is disposed at the periphery of at least one of the plurality of receptacles.

8. The battery module of claim 7, wherein the first protrusion and/or the second protrusion includes a recess extending from a contact surface of the first and/or second protrusion a depth into the first and/or second protrusion.

9. The battery module of claim 8, further comprising:
    a housing comprising a cavity having a first volume configured to receive at least a portion of the array of battery cells.

10. The battery module of claim 9, further comprising:
    a cover comprising a containment cavity having a second volume configured to receive at least a second portion of the array of battery cells, wherein the cover is interconnected to the housing along peripheral contacting surfaces of the housing.

11. The battery module of claim 10, wherein the battery cell location frame is integrally formed in the housing and/or the cover.

12. The battery module of claim 11, further comprising:
    a structural adhesive disposed in the first volume of the housing and around each battery cell in the array of battery cells, the structural adhesive filling the spacing open volume and the area surrounding each battery cell mechanically coupling each battery cell in the array of battery cells together in a force distribution framework.

13. The battery module of claim 12, wherein the structural adhesive is disposed in the recess of the first and/or second protrusion, in an area between the first protrusion and the first planar surface, and/or in an area between the second protrusion and the second planar surface.

14. An energy storage device, comprising:
    a plurality of energy storage cells arranged in a cell distribution pattern, the cell distribution pattern comprising:
        a first terminal array disposed along a first edge of the energy storage device;

a second terminal array disposed along a second edge side of the energy storage device, the second edge disposed opposite the first edge; and internal storage cell array disposed between the first and second edges of the energy storage device;

wherein the first and second terminal arrays each comprise pairs of energy storage cell positions disposed immediately adjacent to and offset from one another in a first line defining a first direction, the pairs of energy storage cell positions repeating along a linear path running in a second direction perpendicular to the first direction, and wherein the internal storage cell array comprises a first row of energy storage cell positions offset in the first and second directions from the pairs of energy storage cell positions in the first and second terminal arrays.

15. The energy storage device of claim 14, wherein the internal storage cell array comprises a second row of energy storage cell positions offset in the first direction and not offset in the second direction from the pairs of energy storage cell positions in the first and second terminal arrays.

16. The energy storage device of claim 15, wherein a first open volume is disposed between sets of four immediately adjacent energy storage cells arranged in the first and/or second terminal array, wherein a second open volume is disposed between adjacent energy storage cells arranged in the internal storage cell array, and wherein the first open volume is greater than the second open volume.

17. The energy storage device of claim 16, wherein the first open volume is configured to receive one or more of a fastener, a fastening sleeve, and/or a standoff of the energy storage device without contacting any energy storage cell in the first and/or second terminal array.

18. The energy storage device of claim 17, further comprising:
an energy storage cell location frame, comprising:
a substantially planar substrate having a first thickness extending from a first planar surface of the substrate to an opposing second planar surface of the substrate, wherein the substrate comprises a plurality of receptacles formed through the first thickness and arranged in the cell distribution pattern, wherein each receptacle in the plurality of receptacles formed through the first thickness is sized to receive an energy storage cell of the plurality of energy storage cells.

19. The energy storage device of claim 18, wherein the energy storage cell location frame further comprises:
a first protrusion extending from the energy storage cell location frame and offset a first distance from the first planar surface in a direction opposite the second planar surface, wherein the first protrusion is disposed at a periphery of at least one of the plurality of receptacles; and a second protrusion extending from the energy storage cell location frame and offset a second distance from the second planar surface in a direction opposite the first planar surface, wherein the second protrusion is disposed at the periphery of at least one of the plurality of receptacles, and wherein the first protrusion and/or the second protrusion includes a recess extending from a contact surface of the first and/or second protrusion a depth into the first and/or second protrusion.

20. A battery for an electric vehicle, comprising:
a plurality of battery modules electrically interconnected with one another, wherein each battery module of the plurality of battery modules comprises an array of battery cells arranged in a battery cell distribution pattern comprising a two-dimensional pattern comprising:
a first row including a plurality of battery cell positions equispaced substantially in a first spacing along a first linear path extending in a first direction, the first row defining an outermost position for battery cells in the array of battery cells disposed along a first outer edge of the battery module;
a second row immediately adjacent to and offset a first distance from the first row in a second direction perpendicular to the first direction, wherein the second row includes a plurality of battery cell positions equispaced substantially in the first spacing along a second linear path extending in the first direction, wherein each of the plurality of battery cell positions in the second row is perpendicularly inline along the second direction with each of the plurality of battery cell positions in the first row; and
a staggered third row immediately adjacent to and offset a second distance from the second row in the second direction, wherein the second distance is less than the first distance, wherein the staggered third row includes a plurality of battery cell positions equispaced substantially in the first spacing along a third linear path extending in the first direction, wherein the plurality of battery cell positions in the staggered third row are offset in the first direction relative to the plurality of battery cell positions in the first and second rows such that the battery cell positions in the staggered third row are not inline along the second direction with the plurality of battery cell positions in the first and second rows.

* * * * *

UNITED STATES PATENT AND TRADEMARK OFFICE
CERTIFICATE OF CORRECTION

PATENT NO.        : 10,644,282 B2
APPLICATION NO.   : 15/878312
DATED             : May 5, 2020
INVENTOR(S)       : Austin L. Newman et al.

Page 1 of 1

It is certified that error appears in the above-identified patent and that said Letters Patent is hereby corrected as shown below:

In the Claims

Claim 14, Column 29, Line 4, before "internal" insert --an-- therein.

Signed and Sealed this
Seventh Day of July, 2020

Andrei Iancu
*Director of the United States Patent and Trademark Office*